United States Patent
Asada et al.

(10) Patent No.: US 11,709,127 B2
(45) Date of Patent: Jul. 25, 2023

(54) MEASUREMENT METHOD AND MEASUREMENT DEVICE, AND CORROSION RESISTANCE TEST METHOD AND CORROSION RESISTANCE TEST APPARATUS FOR COATED METAL MATERIAL

(71) Applicant: MAZDA MOTOR CORPORATION, Hiroshima (JP)

(72) Inventors: Teruaki Asada, Hiroshima (JP); Katsunobu Sasaki, Hiroshima (JP); Tsutomu Shigenaga, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 107 days.

(21) Appl. No.: 17/346,493

(22) Filed: Jun. 14, 2021

(65) Prior Publication Data

US 2021/0396648 A1 Dec. 23, 2021

(30) Foreign Application Priority Data

Jun. 22, 2020 (JP) .................. 2020-107342

(51) Int. Cl.
*G01N 17/02* (2006.01)
*C23F 15/00* (2006.01)

(52) U.S. Cl.
CPC ............. *G01N 17/02* (2013.01); *C23F 15/00* (2013.01)

(58) Field of Classification Search
CPC ...... G01N 17/02; G01N 17/04; G01N 17/006; C23F 15/00

(Continued)

(56) References Cited

U.S. PATENT DOCUMENTS 4,294,667 A * 10/1981 Yamamoto ............... A24B 9/00
204/404
6,805,788 B1 * 10/2004 Gonzalez-Martin ... G01N 17/02
205/775.5

(Continued)

FOREIGN PATENT DOCUMENTS

CN 114137044 A * 3/2022
CN 114481185 A * 5/2022

(Continued)

OTHER PUBLICATIONS

JPH02122248A—English Translation. 2022 (Year: 2022).*
English Translation of JP 2004031256 A. (Year: 2004).*
English Translation of JP H06100570 B2. (Year: 1994).*

*Primary Examiner* — Patrick Assouad
*Assistant Examiner* — Sean Curtis
(74) *Attorney, Agent, or Firm* — Studebaker & Brackett PC

(57) ABSTRACT

Provided is a measurement method for measuring a size of expansion of a surface treatment film occurred in a coated metal material that includes a metal base and the surface treatment film provided on the metal base. The measurement method includes the steps of disposing a water-containing material to be in contact with the expansion and an electrode to be in contact with the water-containing material, and electrically connecting between the electrode and the metal base with an external circuit; applying, with the external circuit, a constant voltage between the electrode and the metal base, as a cathode and an anode, respectively, and measuring a current value flowing therebetween; and calculating a size of the expansion, based on the current value measured and a correlation between the current value and the size of the expansion, the correlation being determined on an exploratory basis in advance.

20 Claims, 15 Drawing Sheets

(58) Field of Classification Search
USPC .......................................... 324/700; 204/404
See application file for complete search history.

(56) References Cited

U.S. PATENT DOCUMENTS

| | | | | |
|---|---|---|---|---|
| 9,476,820 | B2* | 10/2016 | Zhang | G01N 17/02 |
| 10,641,723 | B2* | 5/2020 | Li | G01N 27/041 |
| 11,262,329 | B2* | 3/2022 | Asada | G01N 17/02 |
| 2015/0060273 | A1* | 3/2015 | Zhang | G01N 27/02 |
| | | | | 204/404 |
| 2018/0209928 | A1* | 7/2018 | Li | E21B 47/007 |
| 2018/0274569 | A1* | 9/2018 | Yoshimura | F15D 1/00 |
| 2020/0182824 | A1* | 6/2020 | Asada | G01N 27/413 |
| 2021/0010926 | A1* | 1/2021 | Asada | G01N 17/02 |
| 2021/0395914 | A1* | 12/2021 | Asada | G01N 17/006 |
| 2021/0396648 | A1* | 12/2021 | Asada | G01N 17/02 |
| 2021/0396649 | A1* | 12/2021 | Asada | G01N 27/49 |
| 2021/0396650 | A1* | 12/2021 | Asada | G01N 27/4161 |
| 2022/0034786 | A1* | 2/2022 | Asada | G01N 17/002 |
| 2022/0099556 | A1* | 3/2022 | Asada | G01N 17/02 |
| 2022/0099557 | A1* | 3/2022 | Asada | G01N 17/02 |

FOREIGN PATENT DOCUMENTS

| | | | | |
|---|---|---|---|---|
| DE | 3010750 | C2 * | 3/1990 | |
| EP | 3929562 | A2 * | 12/2021 | G01N 17/02 |
| EP | 3929563 | A1 * | 12/2021 | G01N 17/02 |
| EP | 3929564 | A1 * | 12/2021 | G01N 17/006 |
| EP | 3940367 | A1 * | 1/2022 | C25D 17/005 |
| EP | 3945303 | A2 * | 2/2022 | G01N 17/002 |
| EP | 3974805 | A1 * | 3/2022 | G01N 17/006 |
| EP | 3974806 | A1 * | 3/2022 | G01N 17/006 |
| GB | 2048491 | A | 12/1980 | |
| GB | 2048491 | A * | 12/1980 | G01N 17/02 |
| JP | S59-048649 | A | 3/1984 | |
| JP | H02-122248 | A | 5/1990 | |
| JP | H02122248 | A * | 5/1990 | |
| JP | H06100570 | B2 * | 12/1994 | |
| JP | H07-234202 | A | 9/1995 | |
| JP | H07234202 | A * | 9/1995 | |
| JP | 2004031256 | A * | 1/2004 | |
| JP | 3696334 | B2 * | 9/2005 | |
| JP | 5086287 | B2 * | 11/2012 | |
| JP | 6213426 | B2 * | 10/2017 | |
| JP | 6436688 | B2 * | 12/2018 | |
| JP | 2019-032171 | A | 2/2019 | |
| JP | 2019032171 | A * | 2/2019 | |
| JP | 2019032173 | A * | 2/2019 | |
| JP | 6835281 | B1 * | 2/2021 | G01N 17/006 |
| JP | 2022001856 | A * | 1/2022 | C25D 17/005 |
| JP | 7088396 | B1 * | 6/2022 | |
| JP | 7156481 | B1 * | 10/2022 | |
| WO | WO-9747961 | A1 * | 12/1997 | G01N 17/00 |
| WO | WO-2019026843 | A1 * | 2/2019 | G01N 17/00 |
| WO | 2019/026843 | A1 | 7/2020 | |

* cited by examiner

FIG.10

| | | MUTs | | | |
|---|---|---|---|---|---|
| | | D1 | D2 | D3 | D4 |
| ELECTRO-DEPOSITION COATING FILM | BAKING CONDITIONS | 150°C×20 min | 140°C×15 min | 150°C×20 min | 140°C×15 min |
| | EVALUATION | EXCELLENT | POOR | EXCELLENT | POOR |
| CHEMICAL CONVERSION COATING | FILM STATE | NON-TRANSPARENT | NON-TRANSPARENT | TRANSPARENT | TRANSPARENT |
| | EVALUATION | EXCELLENT | EXCELLENT | POOR | POOR |
| REFERENCE EXAMPLES (ACTUAL CORROSION TEST) | EXPANSION DIAMETER (mm) | 0.5 | 3.2 | 4.5 | 7 |
| | EVALUATION | EXCELLENT | GOOD | GOOD | POOR |
| EXPERIMENTAL EXAMPLES | PEELING DIAMETER (mm) | 2 | 5.5 | 7.5 | 10 |
| | EXPANSION OF ELECTRODEPOSITION COATING FILM PHOTOGRAPH AFTER PEELING | 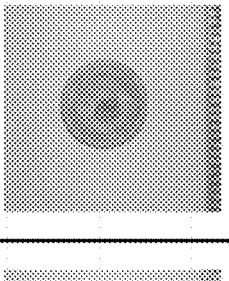 | 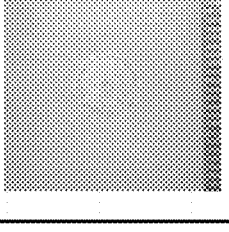 | 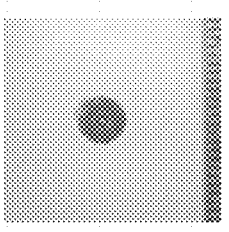 | 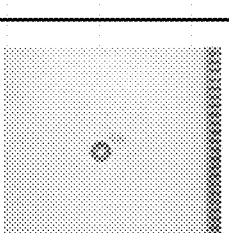 |
| | EVALUATION | EXCELLENT | GOOD | GOOD | POOR |

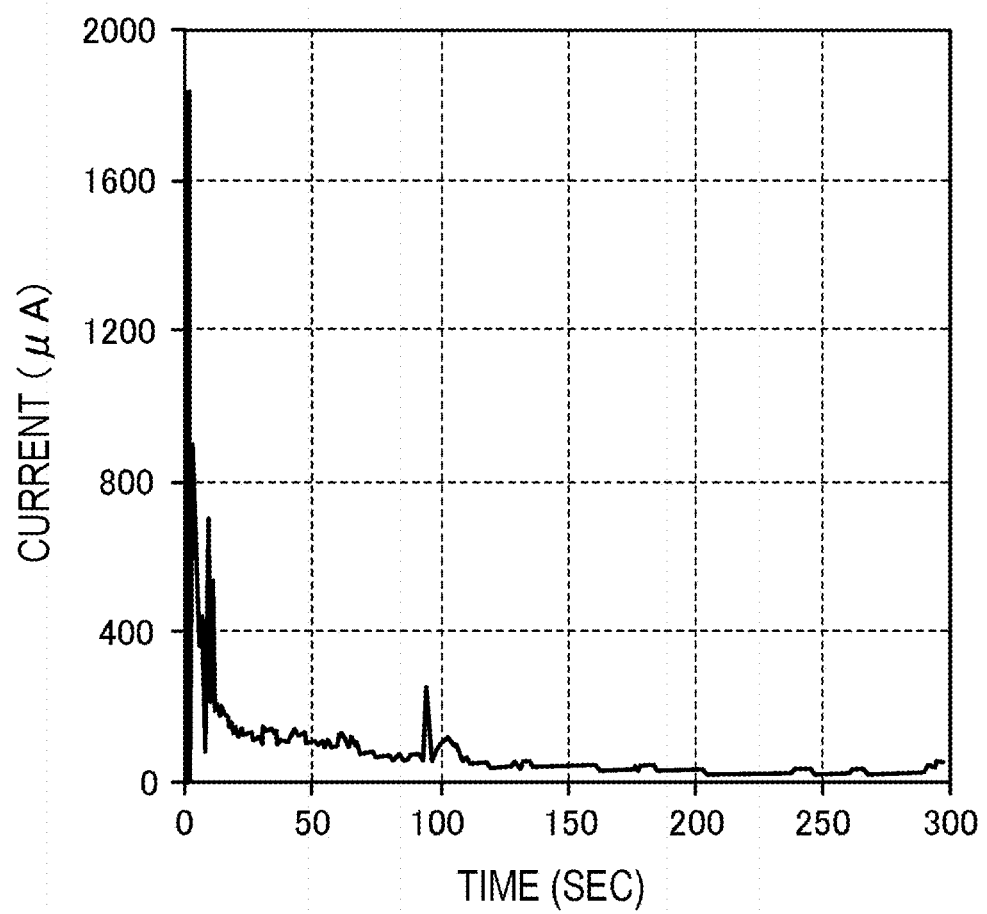

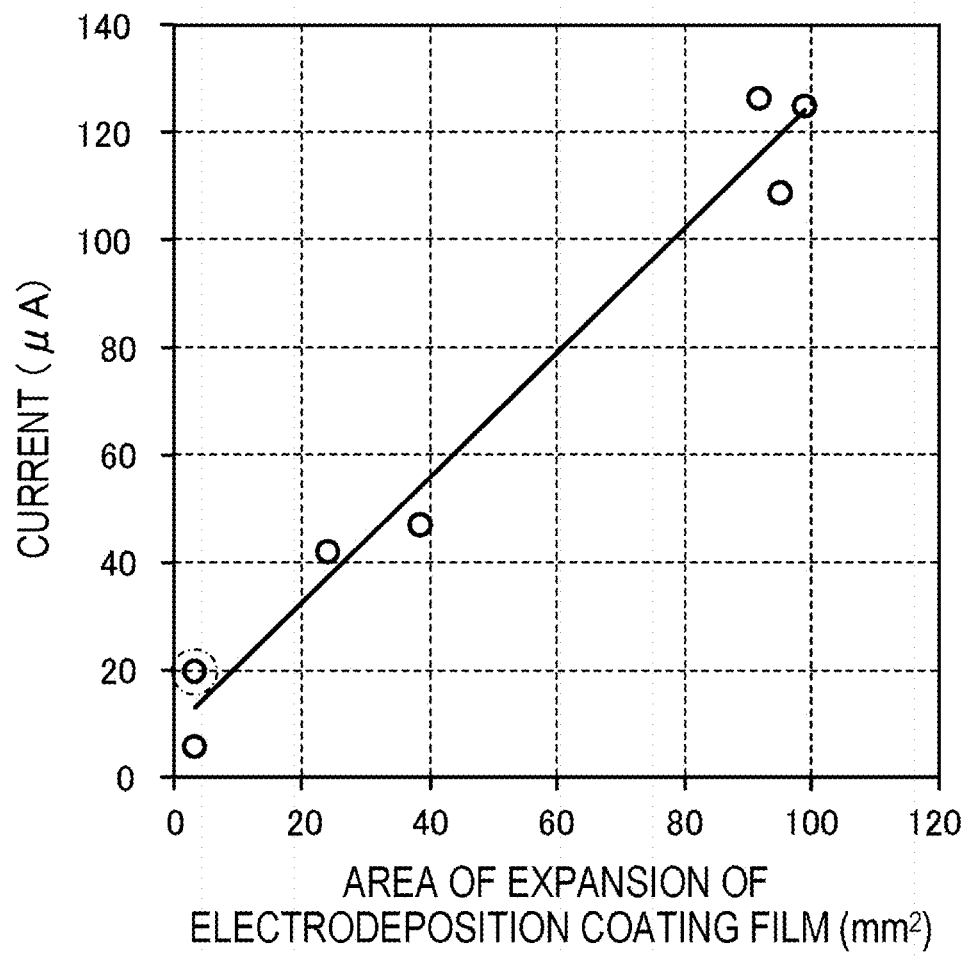

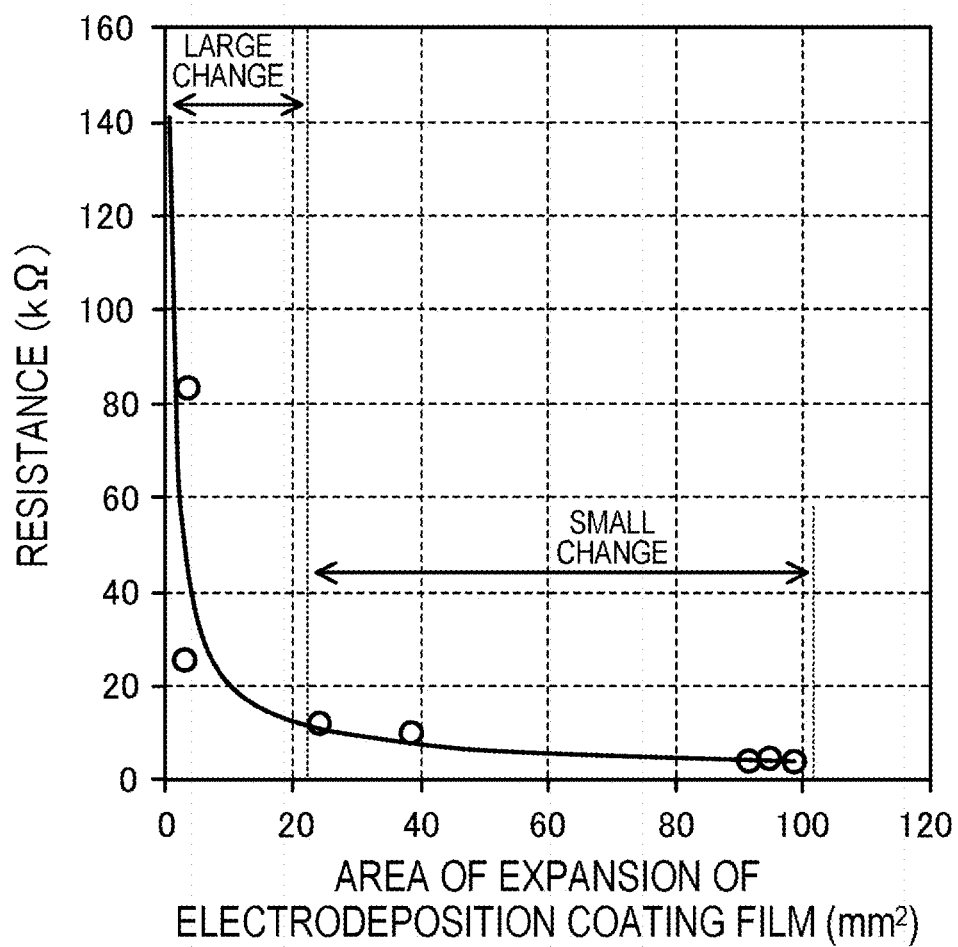

MEASUREMENT METHOD AND MEASUREMENT DEVICE, AND CORROSION RESISTANCE TEST METHOD AND CORROSION RESISTANCE TEST APPARATUS FOR COATED METAL MATERIAL

CROSS-REFERENCE TO RELATED APPLICATION

This application claims priority to Japanese Patent Application No. 2020-107342 filed on Jun. 22, 2020, the entire disclosure of which is incorporated by reference herein.

BACKGROUND

The present disclosure relates to a measurement method and measurement device for measuring a size of expansion of the surface treatment film, and a corrosion resistance test method and corrosion resistance test apparatus for the coated metal material.

As a technique for evaluating the performance of coating films, the accelerated corrosion test such as a combined cycle test and a salt spray test has been performed.

The accelerated corrosion test requires several months for evaluation. It is thus difficult to simply evaluate, for example, the film quality of the coating film to be coated on steel sheets made of different components under different baking conditions and to rapidly optimize coating conditions. Thus, in the material development, the process control in coating factories, and the quality control relating to the rust prevention for vehicles, it is desired to establish a quantitative evaluation method for rapidly and simply evaluating the corrosion resistance of coated steel sheets.

To achieve this desire, Japanese Unexamined Patent Publication No. S59-48649 describes a corrosion resistance evaluation method for a coating film, in which a DC voltage or direct current is applied to a coated metal continuously or intermittently at a counter electrode through a solution, and suitability of the coated metal is determined from the width of a portion of the coating film peeled from a coating film defective portion of the coated metal due to anodic polarization of the coated metal.

Further, the inventors of the present application had focused on the fact that the corrosion of the coated metal material progresses due to a damaged portion in the surface treatment film on the metal base, and has been already filed a patent application for an electrochemical corrosion resistance test method simulating such corrosion (e.g., Japanese Unexamined Patent Publication No. 2019-032171 and Japanese Patent Application No. 2019-534500).

SUMMARY

The method mentioned above is for testing corrosion resistance of a coated metal material by evaluating a size of expansion of a surface treatment film occurred in the coated metal material. However, measuring the size of the expansion by visual observation causes an error. This may reduce reliability of the corrosion resistance test.

Hence, the present disclosure is intended to provide a highly reliable, simple measurement method and measurement device for measuring a size of expansion of a surface treatment film with high versatility, and a corrosion resistance test method and corrosion resistance test apparatus for a coated metal material.

Solution to the Problems

To achieve the foregoing object, the measurement method disclosed herein is directed to a measurement method for measuring a size of expansion of a surface treatment film occurred in a coated metal material that includes a metal base and the surface treatment film provided on the metal base. The measurement method includes the steps of disposing a water-containing material to be in contact with the expansion and an electrode to be in contact with the water-containing material, and electrically connecting between the electrode and the metal base with an external circuit; applying, with the external circuit, a constant voltage between the electrode and the metal base, as a cathode and an anode, respectively, and measuring a current value flowing therebetween; and calculating a size of the expansion, based on the current value measured and a correlation between the current value and the size of the expansion, the correlation being determined on an exploratory basis in advance.

For example, in the corrosion resistance test for a coated metal material, a sample with a damaged portion is exposed to a corrosion environment, and the progress degree of the corrosion of the coated metal material may be evaluated, based on the size of the damaged portion before the test and the size of the expansion of a surface treatment film occurred around the damaged portion. In this case, the size of the expansion of the surface treatment film after the test is required to be measured accurately. However, measuring the size of the expansion by visual observation using an image of the expansion occurred or the like for each test may increase the error in the test.

In the present configuration, a constant voltage is applied between the electrode and the metal base as a cathode and an anode, respectively. This brings the anode reaction (oxidation reaction) in which the metal base is dissolved to progress in an expanded portion. Further, a cathode reaction (reduction reaction) in which residual oxygen and the like in the water-containing material are reduced to generate $OH^-$ and the like progresses at the electrode. The inventors of the present application found that a current value flowing between the electrode and the metal base increases linearly with respect to the size of the expansion. Accordingly, the present configuration allows the size of the expansion of the surface treatment film to be measured using the electrochemical technique; this enables the process of the test to be simplified and a measuring error to be reduced.

The "size of the expansion of the surface treatment film" herein refers to an expansion diameter or expansion area, or a peeling diameter or peeling area. The "expansion diameter" and the "expansion area" refer to the diameter and area of the expanded portion of the surface treatment film, respectively. The "peeling diameter" and the "peeling area" refer to the diameter and area of a peeled portion which is the exposing surface of the metal base exposed by peeling the expanded portion of the surface treatment film after the corrosion resistance test, respectively.

The constant voltage may be less than a theoretical voltage at which electrolysis of water occurs to generate hydrogen.

In response to the application of a constant voltage which is equal to or higher than the theoretical voltage at which electrolysis of water occurs to generate hydrogen, electrolysis of water progresses along with the cathode reaction at the electrode. With the progress of the electrolysis of water, an energy loss occurs due to the generation of hydrogen. Further, the current value may be unstable due to attachment of bubbles of hydrogen to the electrode arising from the size and shape of the electrode, for example. In the present configuration, the application of the constant voltage less than the theoretical voltage at which electrolysis of water occurs to generate hydrogen enables a reduction in the generation of hydrogen, thereby improving accuracy of measurement of the size of the expansion.

The constant voltage may be less than 1.23 V.

The theoretical voltage at which electrolysis of water occurs to generate hydrogen is known to be 1.23 V (25° C.). In the present configuration, a constant voltage of less than 1.23 V is applied. This enables a reduction in the generation of hydrogen due to electrolysis of water. Accordingly, the accuracy of the measurement of the size of the expansion can be improved.

The size of the expansion may be an area of the expansion, and the area of the expansion may be 0.1 $mm^2$ or more to 200 $mm^2$ or less.

This configuration allows the area of the expansion to be calculated accurately and easily as the size of the expansion.

The surface treatment film may be a resin coating film.

The coated metal material including a metal base and the resin coating film provided as a surface treatment film on the metal base facilitates progress of the expansion of the resin coating film between the metal base and the resin coating film, thereby improving the reliability of the corrosion resistance test.

The measurement device disclosed herein is directed to a measurement device for measuring a size of expansion of a surface treatment film occurred in a coated metal material that includes a metal base and the surface treatment film provided on the metal base. The measurement device includes: an electrode to be in contact with a water-containing material disposed to be in contact with the expansion; an external circuit configured to electrically connect between the electrode and the metal base; a current supplier provided on the external circuit and configured to supply a constant voltage between the electrode and the metal base as a cathode and an anode, respectively; a current detector configured to detect a current value flowing between the electrode and the metal base; and a calculator configured to calculate a size of the expansion, based on the current value detected and a correlation between the current value and the size of the expansion, the correlation being determined on an exploratory basis in advance.

This configuration allows the size of the expansion of the surface treatment film to be measured using a device based on the electrochemical technique, thereby reducing an error.

The constant voltage may be less than a theoretical voltage at which electrolysis of water occurs to generate hydrogen.

In the present configuration, a constant voltage that is less than the theoretical voltage at which electrolysis of water occurs to generate hydrogen is applied. This enables improvement in the accuracy of the measurement of the size of the expansion.

The constant voltage may be less than 1.23 V.

In the present configuration, a constant voltage of less than 1.23 V is applied. This enables a reduction in the generation of hydrogen due to electrolysis of water. Accordingly, the accuracy of the measurement of the size of the expansion can be improved.

A corrosion resistance test method for a coated metal material disclosed herein is directed to a corrosion resistance test method for a coated metal material that includes a metal base and a surface treatment film provided on the metal base. The corrosion resistance test method includes the steps of: preparing a coated metal material having one or more damaged portions reaching the metal base through the surface treatment film; disposing a water-containing material to be in contact with one or two out of the one or more damaged portions and one or two electrodes to be in contact with the water-containing material, and electrically connecting between the electrode and the metal base, or between the two electrodes, with an external circuit; measuring a size of one or two out of the one or more damaged portions; supplying, with the external circuit, a current between the electrode and the metal base, or between one of the two electrodes and the other, as an anode and a cathode, respectively to expand the surface treatment film around the one or two out of the one or more damaged portions; measuring a size of expansion of the surface treatment film using the measurement method of claim 1; and calculating a progress degree of corrosion of the coated metal material, based on the size of the one or two out of the one or more damaged portions and the size of the expansion.

Metal corrosion is known to progress through an anode reaction (oxidation reaction) of generating free electrons by melting (ionizing) metal that is in contact with water and a cathode reaction (reduction reaction) of reducing dissolved oxygen and the like in water by the free electrons to generate a hydroxyl group $OH^-$ and the like, occurred in parallel.

In this configuration, a current is supplied between the electrode and the metal base, or between one of the two electrodes and the other, as an anode and a cathode, respectively.

For the metal base material serving as a cathode, the cathode reaction progresses in the exposing portion of the damaged portion. For one of the electrodes serving as an anode, the cathode reaction progresses in the exposing portion of the metal base at the damaged portion positioned near the electrode serving as an anode via the water-containing material. In either case, electrolysis may also progress depending on the current supply conditions to generate hydrogen.

With the progress of the cathode reaction, $OH^-$ is generated. This brings the area around the damaged portion to be in an alkaline environment. This damages the under-treated surface (chemically converted surface) of the metal base, thereby reducing adherence of the surface treatment film (simply reducing adherence between the metal base and the surface treatment film for no treatment performed on the surface of the metal base). Accordingly, the surface treatment film is expanded around the damaged portion. Further, a hydrogen gas generated by electrolysis of water and reduction of $H^+$ accelerates the expansion of the surface treatment film. Such progress of the cathode reaction and expansion of the surface treatment film are accelerated reproduction of actual corrosion of the coated metal material. Accordingly, by comparing the size of the damaged portion before the current supply and the size of the expansion of the surface treatment film occurred around the damaged portion to check the progress degree of the expansion, the corrosion progression rate of the coated metal material can be determined.

In this configuration, the size of the expansion of the surface treatment film is measured by the measurement method mentioned above in such as a corrosion resistance test. This enables a reduction in measuring error of the size of the expansion. Accordingly, the reliability of the corrosion resistance test can be improved.

The corrosion resistance test method may further include the step of correcting the calculated progress degree of the corrosion of the coated metal material, based on the size of the one or two out of the one or more damaged portions and a correlation between the size of the damaged portion and the progress degree of the corrosion of the coated metal material, the correlation being determined on an exploratory basis in advance.

A variation in the size of the damaged portion before the current supply causes variations in the progress degree of the cathode reaction and electrolysis of water which progress at the damaged portion, the degree of closure of the damaged portion due to expansion of the surface treatment film, the degree of degassing of hydrogen generated in the expanded surface treatment film, and the like. This may further cause a variation in the size of the expansion of the surface treatment film, resulting in a reduction in the reliability of the corrosion resistance test.

Thus, in the present configuration, the progress degree of the corrosion of the coated metal material calculated is corrected, based on the size of the damaged portion measured, and a correlation between the size of the damaged portion and the progress degree of the corrosion of the coated metal material. The correlation is determined on an exploratory basis in advance. This allows accurate evaluation of the progress degree of the corrosion of the coated metal material regardless of the size of the damaged portion before the current supply. Accordingly, the reliability and versatility of the corrosion resistance test can be enhanced.

The "size of the damaged portion" herein refers to the size of the damaged portion in a plan view, and is, for example, the area or diameter of the damaged portion. For a circular damaged portion in a plan view, the area of the damaged portion is given by the area of the circle. The diameter of the damaged portion is given by the maximum width of the damaged portion. The size of the damaged portion herein is assumed to be the same as the size of the exposing portion of the metal base at the damaged portion.

The progress degree of corrosion may be a rate of increase in the size of the expansion of the surface treatment film.

The rate of increase in the size of the expansion of the surface treatment film corresponds to the corrosion progress rate. Accordingly, the rate of increase in the size of expansion of the surface treatment film obtained as the progress degree of corrosion of the coated metal material enables highly reliable corrosion resistance test to be performed.

The one or more damaged portions may be one or more artificially damaged portions.

For example, a damage portion may be made artificially in the corrosion resistance test to bring corrosion to accelerate. The present configuration allows effective measurement of the size of the expansion of the surface treatment film occurred at such an artificially damaged portion. Accordingly, the reliability of the corrosion resistance test can be improved.

The one or more artificially damaged portions may be in a dot shape in a plan view.

In this configuration, the artificially damaged portion is in a dot shape in a plan view. This allows the surface treatment film to be expanded effectively in a dome shape in response to the corrosion when a sample with the artificially damaged portion is exposed to the corrosion environment in the corrosion resistance test mentioned above, for example. Accordingly, the corrosion in such a corrosion resistance test can be accelerated.

A corrosion resistance test apparatus for a coated metal material disclosed herein is directed to a corrosion resistance test apparatus for a coated metal material that includes a metal base and a surface treatment film provided on the metal base. The corrosion resistance test apparatus includes: one or two electrodes to be in contact with a water-containing material disposed to be in contact with one or two out of one or more damaged portions reaching the metal base through the surface treatment film; an external circuit configured to electrically connect between the electrode and the metal base, or between the two electrodes; an additional measurement device for measuring a size of the one or two out of the one or more damaged portions; a current supplier provided on the external circuit and configured to supply a current between the electrode and the metal base, or between one of the two electrodes and the other, as an anode and a cathode, respectively to expand the surface treatment film around the one or two out of the one or more damaged portions; the measurement device with any one of the configurations mentioned above, for measuring the size of expansion of the surface treatment film; and a calculator configured to calculate a progress degree of corrosion of the coated metal material, based on the size of the one or two out of the one or more damaged portions and the size of the expansion.

In this configuration, the size of the expansion of the surface treatment film is measured by the measurement device mentioned above. This enables a reduction in measuring error of the size of the damaged portion.

The corrosion resistance test apparatus may further include a corrector configured to correct the progress degree of the corrosion of the coated metal material calculated by the calculator, based on the size of the one or two out of the one or more damaged portions and a correlation between the size of the damaged portion and the progress degree of the corrosion of the coated metal material, the correlation being determined on an exploratory basis in advance.

In this configuration, the calculated progress degree of the corrosion of the coated metal material is corrected using the corrector. This allows accurate evaluation of the progress degree of the corrosion of the coated metal material regardless of the size of the damaged portion before the current supply. Accordingly, the reliability and versatility of the corrosion resistance test can be enhanced.

Advantages of the Invention

As mentioned above, the present disclosure allows the size of the expansion of the surface treatment film to be measured using the electrochemical technique; this enables the process of the test to be simplified and a measuring error to be reduced.

BRIEF DESCRIPTION OF THE DRAWINGS

FIG. 10 is a table showing results of the corrosion resistance test in Experimental Examples and Reference Examples.

FIG. 11 is a graph showing experimental results on a second measurement step.

FIG. 12 is a graph showing other experimental results on the second measurement step.

FIG. 13 is a graph showing yet other experimental results on the second measurement step.

DETAILED DESCRIPTION

Embodiments of the present disclosure will now be described with reference to the drawings. The following description of the embodiments is merely an example in nature, and is not intended to limit the scope, applications, or use of the present disclosure.

First Embodiment

Figure 1:
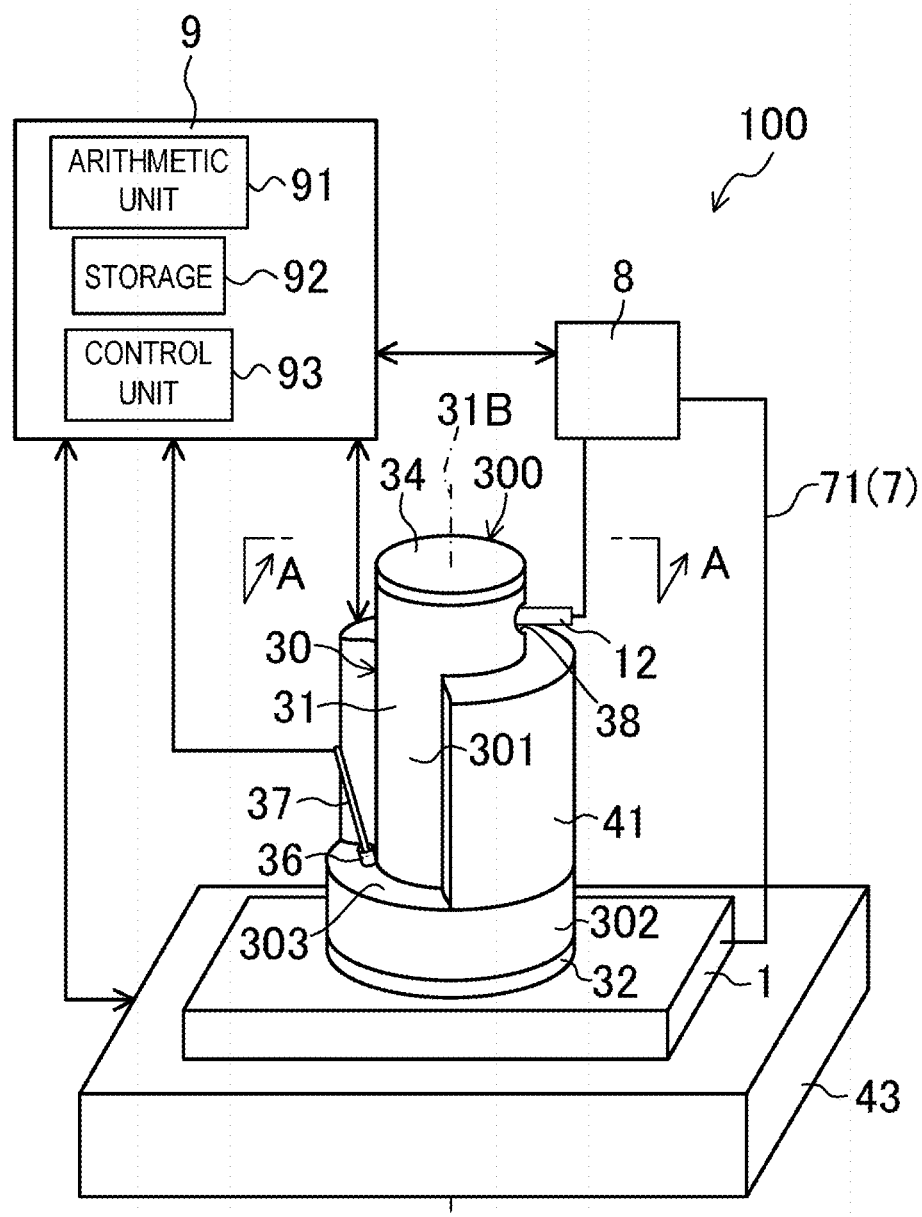
FIG. 1 illustrates an example corrosion resistance test apparatus according to a first embodiment.
Figure 2:
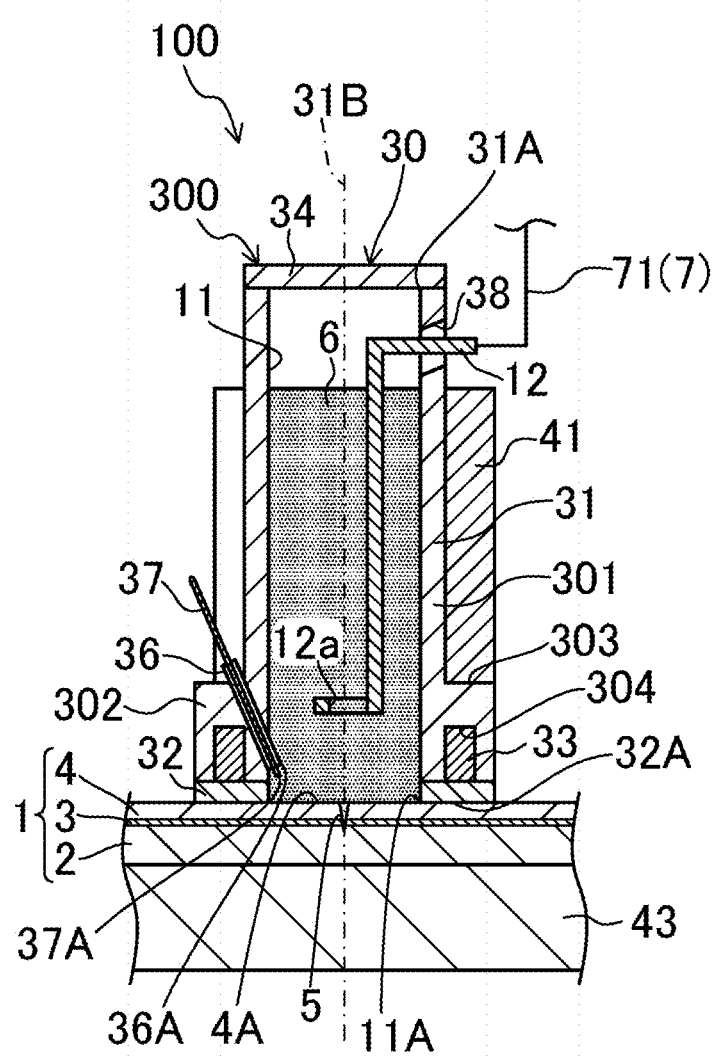
FIG. 2 is a cross-sectional view taken along line A-A shown in FIG. 1.
Figure 3:
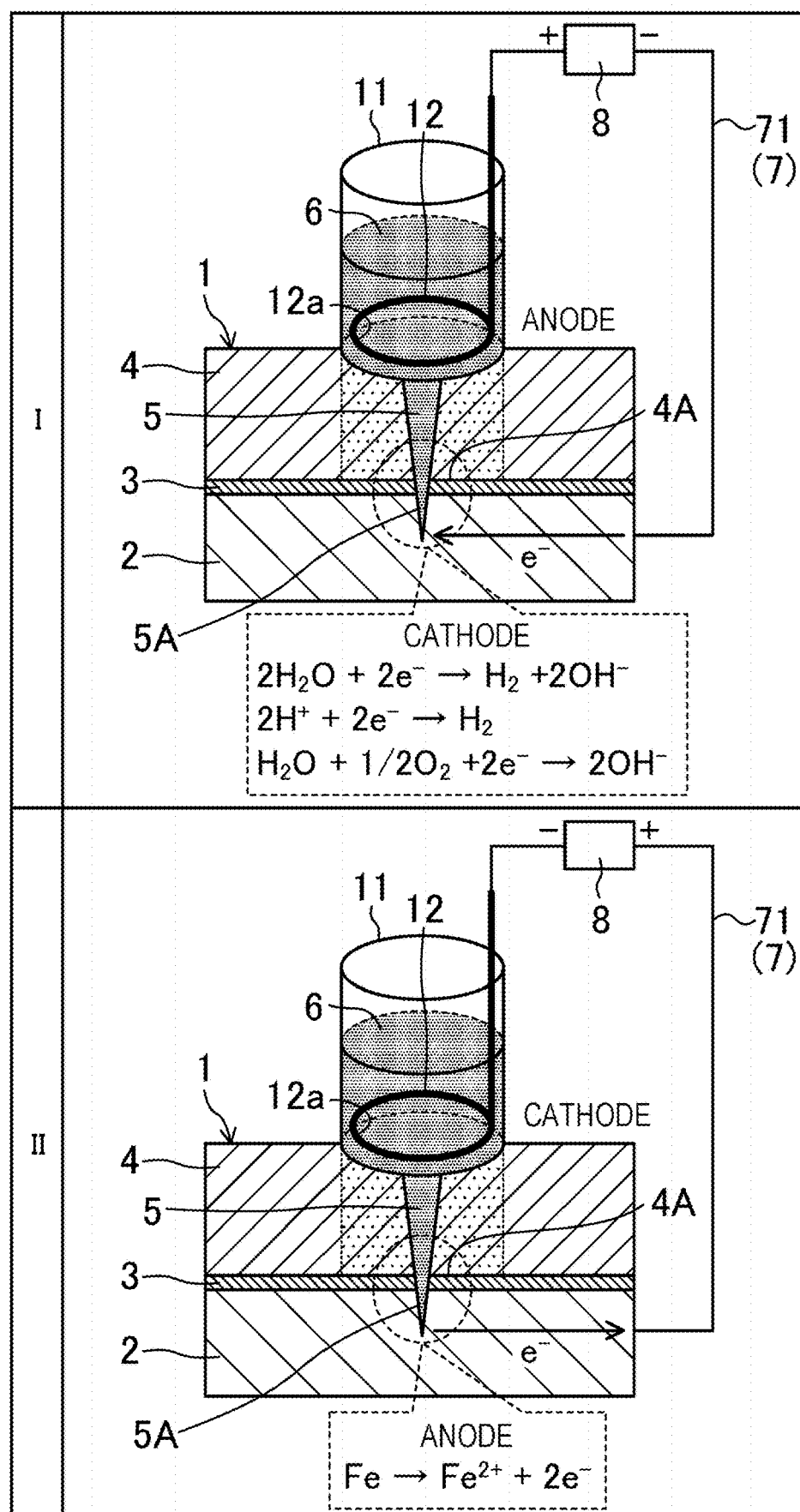
FIG. 3 illustrates the principle of a corrosion resistance test according to the first embodiment.

FIGS. 1 and 2 illustrate an example corrosion resistance test apparatus according to the present embodiment, which is for a coated metal material. FIG. 3 illustrates the principle of a corrosion resistance test method according to the present embodiment. In FIGS. 1 to 3, the reference numeral 1 represents the coated metal material, the reference numeral 300 represents an electrode portion device, and the reference numeral 100 represents the corrosion resistance test apparatus.

<Coated Metal Material>

Examples of the coated metal material targeted for the corrosion resistance test according to the present embodiment include a coated metal material including a metal base and a resin coating film provided as a surface treatment film on the metal base.

The metal base may be, for example, a steel material for forming an electric household appliance, a building material, or an automobile part, such as a cold-rolled steel plate (SPC), a galvanized alloy steel sheet (GA), a high-tensile strength steel sheet, or a hot stamping material, or may be a light alloy material. The metal base may include, on its surface, a chemical conversion coating (e.g., a phosphate coating, such as a zinc phosphate coating, or a chromate coating).

Specific examples of the resin coating film include cationic electrodeposition coating films (undercoat films) based on an epoxy resin, an acrylic resin, and the like.

The coated metal material may include a multilayer film of two or more layers as the surface treatment film. Specifically, for example, for the surface treatment film being a resin coating film, the coated metal material may be a multilayered coating film obtained by overlaying a topcoat film on an electrodeposition coating film or by overlaying an intermediate coating film and a topcoat film on an electrodeposition coating film.

The intermediate coating film serves to secure reliable finishing and chipping resistance of the coated metal material and to improve adherence between the electrodeposition coating film and the topcoat film. The topcoat film secures reliable color, finishing, and weather resistance of the coated metal material. Specifically, these coating films may be made from, for example, a paint containing: a base resin, such as a polyester resin, an acrylic resin, and an alkyd resin; and a crosslinking agent, such as a melamine resin, a urea resin, and a polyisocyanate compound (including a blocked polyisocyanate compound).

This configuration allows, for example, taking out of parts from the manufacturing line in each coating step and check of the qualities of the coating films, in a manufacturing process of an automobile member.

A coated metal material 1 including: a metal base that includes a steel sheet 2 and a chemical conversion coating 3 on the steel sheet 2; and an electrodeposition coating film 4 (resin coating film) provided as a surface treatment film on the metal base will be described below as an example.

As illustrated in FIGS. 2 and 3, the coated metal material 1 has one damaged portion 5 reaching the steel sheet 2 through the electrodeposition coating film 4 and the chemical conversion coating 3. The damaged portion 5 may be artificially made or naturally made. A plurality of damaged portions 5 may be made apart from each other. In this case, one damaged portion 5 means one of the damaged portions 5.

<Water-Containing Material>

A water-containing material 6 contains water and a supporting electrolyte, and functions as a conductive material. The water-containing material 6 may be a muddy material further containing a clay mineral. For the water-containing material 6 further containing a clay mineral, ions and water in the water-containing material 6 easily permeate through a portion of the electrodeposition coating film 4 around the damaged portion 5 in the holding step S7 and current supply step S9, which will be described later.

The supporting electrolyte is a salt and is for imparting sufficient electrical conductivity to the water-containing material 6. The supporting electrolyte may be at least one salt selected from sodium chloride, sodium sulfate, calcium chloride, calcium phosphate, potassium chloride, potassium nitrate, potassium hydrogen tartrate, and magnesium sulfate. The supporting electrolyte may be particularly preferably at least one salt selected from sodium chloride, sodium sulfate, and calcium chloride. The water-containing material 6 contains the supporting electrolyte preferably at 1 mass % or more to 20 mass % or less, more preferably at 3 mass % or more to 15 mass % or less, particularly preferably at 5 mass % or more to 10 mass % or less.

The clay mineral is for making the water-containing material 6 into muddy material and promoting the movement of ions and permeation of water into the electrodeposition coating film 4 to accelerate progress of corrosion in the current supply step S9. The clay mineral may be, for example, a layered silicate mineral or zeolite. The layered silicate mineral may be, for example, at least one selected from kaolinite, montmorillonite, sericite, illite, glauconite, chlorite, and talc. Out of these, kaolinite may be particularly preferably employed. The water-containing material may contain a clay mineral preferably at 1 mass % or more to 70 mass % or less, more preferably at 10 mass % or more to 50 mass % or less, particularly preferably at 20 mass % or more to 30 mass % or less. The water-containing material 6 being muddy material is allowed to be provided even on a non-horizontal surface of the electrodeposition coating film 4.

The water-containing material 6 may contain an additive in addition to water, the supporting electrolyte, and the clay mineral. Specific examples of the additive include organic solvents such as acetone, ethanol, toluene, and methanol, and substances for improving wettability of the coating film. These organic solvents, substances, and the like can also function to promote permeation of water into the electrodeposition coating film 4. Any of these organic solvents, substances, and the like may be added to the water-containing material 6 as a substitute for the clay mineral. For the water-containing material 6 containing an organic solvent, the content of the organic solvent is preferably 5% or more to 60% or less relative to the content of water in terms of volume ratio. The volume ratio is preferably 10% or more to 40% or less, more preferably 20% or more to 30% or less.

<Corrosion Resistance Test Apparatus>

The corrosion resistance test apparatus 100 includes an electrode portion device 300, an external circuit 7 (a treatment device, a first measure device, and a second measurement device), a current supplier 8 (a treatment device, a current detector, a first measurement device, a second measurement device), a control device 9 (a calculator, a corrector, a temperature controller, a treatment device, a first measurement device, a second measurement device), an optional rubber heater 41 (a first temperature control element), and an optional hot plate 43 (a second temperature control element).

<<Electrode Portion Device>>

The electrode portion device 300 is for use in a corrosion resistance test according to the present embodiment, and includes a container 30, an electrode 12 (a treatment device, a first measurement device, a second measurement device), and an optional temperature sensor 37 (a temperature detector).

—Container—

The container 30 is placed on the electrodeposition coating film 4 of the coated metal material 1. The container 30 includes a container body 31, an optional bottom portion 32, a lid 34, a through hole 38, and an optional hole 36.

[Container Body and Bottom Portion]

The container body 31 and the bottom portion 32 are each a member in a tubular shape such as a cylindrical shape and a polygonal tubular shape, and are each preferably a member in a cylindrical shape in order to reduce strain when thermally expanded.

The bottom portion 32 is in contact with the surface of the electrodeposition coating film 4 via the bottom surface 32A. The container body 31 is disposed opposite to the bottom surface 32A in the bottom portion 32.

The container body 31 has the same inner diameter as the bottom portion 32. The inside of the space defined by the inner circumferential surfaces of the container body 31 and the bottom portion 32 constitutes a water-containing material holder 11 for holding a water-containing material. The water-containing material holder 11 has an opening 11A provided in the bottom surface 32A. A region of the coated metal material 1 defined by the opening 11A serves as a measurement target portion 4A with the container 30 placed on the electrodeposition coating film 4 of the coated metal material 1.

The water-containing material 6 is in contact with the surface of the electrodeposition coating film 4 and enters the damaged portion 5, with the water-containing material 6 contained in the water-containing material holder 11.

The bottom portion 32 is a sheet-like sealing material made from a silicone resin, for example, and is used to improve adherence between the container body 31 and the electrodeposition coating film 4, and fill the gap therebetween, when the container 30 is placed on the coated metal material 1. This can effectively reduce leaking of the water-containing material 6 from the gap between the container body 31 and the electrodeposition coating film 4. The bottom portion 32 is preferably provided in order to sufficiently reduce leaking of the water-containing material 6, although it may not be provided.

In order to effectively reduce leaking of the water-containing material 6, the bottom portion 32 has a thickness of preferably more than 1 mm, and a hardness of preferably 50 or less as a type A durometer hardness defined in JIS K 6250, as shown in experimental examples to be described later. The upper limit of the thickness of the bottom portion 32 may be, but is not particularly limited to, for example, 10 mm or less, in order to obtain an advantage of the attractive force of a magnet 33, which will be described later, and to reduce a cost of the material for the bottom portion 32. The lower limit of the hardness of the bottom portion 32 may be, but is not particularly limited to, for example, 10 or more as a type A durometer hardness, in order for a product usable as the bottom portion 32 to be easily available.

The container body 31 may be made from a resin material, such as an acrylic resin, an epoxy resin, and aromatic polyether ether ketone (PEEK) or from ceramic, particularly preferably made from at least one resin material selected from the group consisting of an acrylic resin, an epoxy resin, and an aromatic polyether ether ketone (PEEK). This allows a reduction in the weight and cost of the electrode portion device 300, in turn, the corrosion resistance test apparatus 100, while securing insulation between the container body 31 and the outside.

The container body 31 includes a large-diameter portion 302 in the vicinity of the bottom portion 32, and a small-diameter portion 301 disposed opposite to the bottom portion 32 relative to the large-diameter portion 302. The large-diameter portion 302 and small-diameter portion 301 have the same inner diameter around the center axis 31B of the container body 31. The large-diameter portion 302 has an outer diameter larger than the small-diameter portion 301. The outer circumferential surfaces of the large-diameter portion 302 and small-diameter portion 301 are in connection with each other via a step portion 303.

The inner diameters of the container body 31 and bottom portion 32, i.e., the diameter of the water-containing material holder 11, are suitably larger than the damaged portion 5. The container 30 is suitably placed on the electrodeposition coating film 4 such that the water-containing material holder 11 is concentric with the damaged portion 5. The container 30 having the foregoing configuration can contain a sufficient amount of the water-containing material 6 required for the corrosion resistance test while the water-containing material 6 covers the entire damaged portion 5. For example, for the damaged portion 5 having a diameter of 0.1 mm or more to 7 mm or less, the diameter of the water-containing material holder 11 may be, for example, 0.5 mm or more to 45 mm or less, preferably 0.5 mm or more to 30 mm or less. The container 30 having this configuration can contain a sufficient amount of the water-containing material 6 required for the corrosion resistance test while the water-containing material 6 covers the entire damaged portion 5.

A portion of the large-diameter portion 302 in the vicinity of the bottom portion 32 has a groove 304. The groove 304 is positioned around a portion of the water-containing material holder 11 near the opening 11A, and contains a ring-shaped magnet 33 therein. Thus, the container 30 is attracted and fixed to the coated metal material 1 by the attractive force of the magnet 33 while the container 30 is placed on the electrodeposition coating film 4 of the coated metal material 1. This can effectively reduce the displacement of the container 30, and can improve the reliability of the corrosion resistance test to be described below.

The magnet 33 may be, for example, a ferrite magnet, a neodymium magnet, a samarium-cobalt magnet, but is suitably a neodymium magnet or a samarium-cobalt magnet, in order to obtain a high attractive force. The intensity of the magnet 33 is preferably 370 mT or higher, as shown in experimental examples to be described later. This configuration can secure higher adherence between the electrode portion device 300 and the coated metal material 1. The upper limit of the intensity of the magnet 33 may be, but is not particularly limited to, for example, 1300 mT or lower.

The magnet 33 is suitably sealed with, for example, an epoxy resin after being placed in the groove 304. This can reduce removal of the magnet 33 from the groove 304, and leaking of the water-containing material 6 through the water-containing material holder 11 into the groove 304, for example. In addition, the sealing secures insulation between the magnet 33 and the water-containing material 6. This substantially prevents a reduction in the reliability of the corrosion resistance test due to dissolution of highly conductive components of the magnet 33 into the water-containing material 6.

Experimental Examples

A silicone mat serving as a bottom portion 32 made from a silicone resin was placed in a portion of the container body 31 made from an epoxy resin (the inner diameter of the water-containing material holder 11, 10 mm) in the vicinity of the bottom surface 32A, which was then placed on a flat table. Subsequently, water was introduced into the container body 31, which was then held for 10 minutes. Thereafter, the presence or absence of water leakage was checked. A ring-shaped neodymium magnet (manufactured by Magfine Corporation) had been embedded, using an epoxy resin, in a portion of the container body 31 in the vicinity of the bottom surface 32A. Table 1 shows the results. The hardness of the silicone mat was indicated by the type A durometer hardness defined in JIS K 6250.

TABLE 1

| | | Experimental Examples | | | |
|---|---|---|---|---|---|
| | | 1 | 2 | 3 | 4 |
| Magnet | Intensity (mT) | 367 | 367 | 380 | 380 |
| | Attractive Force (kgf) | 4.4 | 4.4 | 5.0 | 5.0 |
| Silicone Mat (Bottom Portion) | Hardness (Type A Durometer Hardness) | 70 | 50 | 50 | 50 |
| | Thickness (mm) | 0.5 | 0.5 | 1 | 1.5 |
| Presence or Absence of Water Leakage | | Present | Present | Present | Absent |

The results of Experimental Examples 1 to 4 demonstrate that water leakage can be more effectively reduced when the intensity of the magnet is higher, the hardness of the silicone mat is lower, and the thickness of the silicone mat is higher.

[Lid]

The lid 34 closes the upper opening 31A of the container body 31. The volatilization of a solvent component of the water-containing material 6 during the corrosion resistance test changes the concentration of a component of the water-containing material 6, which may reduce the reliability of the test. The lid 34 closing the upper opening 31A reduces releasing of a volatile component of the water-containing material 6 moving upward in the container body 31 to the outside. Accordingly, the reduction in water-containing material 6 during the test can be substantially prevented. Further, for the test performed with an increase in temperatures of the water-containing material 6 and the coated metal material 1, the temperature keeping efficiency can be increased.

Similarly to the container body 31, the lid 34 may be made from a resin material, such as an acrylic resin, an epoxy resin, and aromatic polyether ether ketone (PEEK) or from ceramic, particularly preferably made from at least one resin material selected from the group consisting of an acrylic resin, an epoxy resin, and an aromatic polyether ether ketone (PEEK). This allows reduction in the weight and cost of the electrode portion device 300, in turn, the corrosion resistance test apparatus 100, while securing insulation between the water-containing material holder 11 and the outside.

In particular, the use of the PEEK material as a material for the container body 31 and/or the lid 34 allows a reduction in erosion of the container body 31 and/or the lid 34 due to a malfunction of the rubber heater 41 and/or the hot plate 43 or other issues.

The container body 31 and the lid 34 may be made from different materials or the same material. The container body 31 and the lid 34 may be integral with or separate from each other.

[Through Hole]

The through hole 38 is a hole for releasing the internal pressure of the container 30, provided in the upper side wall of the container body 31, that is, a side wall above the upper surface of the water-containing material 6 in the container body 31 so as to penetrate the side wall. During the corrosion resistance test, gases such as hydrogen may be generated through chemical reaction. In such case, complete sealing of the container body 31 increases the internal pressure of the container 30, which may lead to breakage of the container 30 and other issues. In the present configuration, gases generated during the test are removed through the through hole 38. This substantially prevents the increase in the internal pressure of the container 30. Moreover, the through hole 38 is provided in the upper side wall of the container body 31. This reduces leaking of the water-containing material 6, releasing of the volatile component of the water-containing material 6, and other issues, compared with the case where the through hole 38 is provided in the lower side wall (a portion of the side wall below the upper surface of the water-containing material 6 in the container body 31), the lid 34, or the like.

The through hole 38 may also be used for pulling out the electrode 12 or wiring 71 of the external circuit 7 and/or for introducing the water-containing material 6.

The number of the through holes 38 may be one or more. The number of the through holes 38 is preferably one, two, or three. For one through hole 38, the through hole 38 is used for the three purposes. This simplifies the configuration of the electrode portion device 300 and requires a few through holes 38, thereby allowing the effective reduction in releasing of the volatile component of the water-containing material 6. For two or three through holes 38, the through holes 38 may share the three purposes. This facilitates operations for the three purposes.

The shape of the through hole 38 used for releasing the internal pressure is not particularly limited, but the through hole 38 for the other purposes is suitably a straight hole having a circular cross section and a constant diameter in order to facilitate operation.

The water-containing material 6 may be introduced into the water-containing material holder 11 with a dropper or a syringe, for example. Considering this, the through hole 38 which may be used for introducing the water-containing material 6 is suitably tilted downward from the outside of the container body 31 toward its inside, as illustrated in FIG. 2. This facilitates introduction of the water-containing material 6.

The diameter of the through hole 38, i.e., the maximum width in the cross section perpendicular to the center axis of the through hole 38 is preferably 1 mm or more to 7 mm or less, more preferably 2 mm or more to 5 mm or less. For a large amount of gases generated, the through hole 38 having a diameter less than the lower limit may cause insufficient release of the internal pressure of the container 30, or may cause difficulty in the use for the other purposes. The through hole 38 having a diameter more than the upper limit may excessively release a volatile component of the water-containing material 6 therethrough.

[Hole]

Preferably, a hole 36 for allowing a temperature sensor 37 to be inserted therein is provided in the lower side wall of the container body 31, that is, a portion of the side wall below the upper surface of the water-containing material 6 in the container body 31.

The bottom 36A of the hole 36 is penetrating the container body 31 to the inside. This enables the distal end 37A of the temperature sensor 37 inserted into the hole 36 to enter the inside of the water-containing material holder 11 though the bottom 36A to be in contact with the water-containing material 6. Accordingly, the temperature sensor 37 can detect the temperature of the water-containing material 6.

The hole 36 is suitably such that its bottom 36A becomes close to the electrodeposition coating film 4 as much as possible when the container 30 is disposed on the electrodeposition coating film 4.

Specifically, for example, such a hole 36 may be provided in the side wall of the container body 31 using a mold when the container body 31 is formed. In addition, the hole 36 may be provided by embedding a tubular member made from an insulating material such as a resin with a high thermal conductivity and a ceramic, in the side wall of the container body 31 using insert molding when the container body 31 is formed.

Note that the hole 36 may be provided so that the bottom 36A does not penetrate the container body 31 to the inside.

—Temperature Sensor—

The electrode portion device 300 preferably includes a temperature sensor 37 for detecting the temperature of the water-containing material 6. The temperature sensor 37 is inserted into the hole 36 to detect the temperature of the water-containing material 6.

In the corrosion resistance test according to the present embodiment, the temperature of the water-containing material 6, particularly portion of the water-containing material 6 near the electrodeposition coating film 4 is important. The temperature sensor 37 inserted into the hole 36 can accurately detect the temperature of the portion of the water-containing material 6 near the electrodeposition coating film 4, thereby improving the reliability of the corrosion resistance test.

Specific examples of the temperature sensor 37 include a thermocouple, a fiber optic thermometer, and an infrared thermometer. With being inserted into the hole 36, the temperature sensor 37 is preferably molded with a resin having a high thermal conductivity or another material in order to further accurately detect the temperature of the water-containing material 6.

An amount of the distal end 37A of the temperature sensor 37 entering the inside of the container body 31 is suitably as small as possible. This can substantially prevent the reduction in accuracy of the detection of the temperature due to adhering of the electrodeposition coating film 4 expanded in the current supply step S9 to be described later to the distal end of the temperature sensor 37.

For the electrode portion device 300 having no hole 36 and no temperature sensor 37, a thermometer may be placed in the water-containing material holder 11 to measure the temperature of the water-containing material 6.

—Electrode—

The electrode 12 is provided with its distal end 12a being sunk in the water-containing material 6 and thus is in contact with the water-containing material 6.

Specific examples of the electrode 12 include a carbon electrode and a platinum electrode.

The electrode 12 may be in a shape commonly used in electrochemical measurement, but is preferably a perforated electrode having at least one hole at its distal end 12a. The distal end 12a is preferably disposed such that the hole is substantially parallel to the surface of the electrodeposition coating film 4. For example, a perforated electrode has a ring-shaped distal end 12a, and is provided such that the ring faces the electrodeposition coating film 4. Alternatively, a mesh electrode may be employed as the perforated electrode. The mesh electrode may be disposed to be substantially parallel with the electrodeposition coating film 4 with being sunk in the water-containing material 6.

The cleaning step S4 and current supply step S9, which will be described later, may cause hydrogen to be generated at the damaged portion 5. The hydrogen is removed through the hole provided in the distal end 12a, thereby avoiding retention of the hydrogen between the electrode 12 and the electrodeposition coating film 4. In this way, it is possible to avoid deterioration of the electrical conductivity.

<<External Circuit>>

The external circuit 7 includes a wiring 71 and a current supplier 8 (current detector) disposed on the wiring 71. The wiring 71 electrically connects between the electrode 12 and the steel sheet 2. The wiring 71 may be of any known type.

—Current Supplier—

The current supplier 8 serves as a power supply that supplies a voltage/current between the electrode 12 and the steel sheet 2 particularly in the cleaning step S4, first measurement step S5, current supply step S9, and second measurement step S10, which will be described later. The current supplier 8 also serves as a current detector/voltage detector that detects a current/voltage flowing between them. Specific examples of the current supplier 8 include a potentiostat/galvanostat that can control an applied voltage/current.

The current supplier 8 is electrically or wirelessly connected to the control device 9 to be described later, and is controlled by the control device 9. Current supply information such as a voltage value, a current value, time for current supply, and other parameters applied from the current supplier 8 to the external circuit 7 or detected by the current supplier 8 are transmitted to the control device 9.

<<Rubber Heater and Hot Plate>>

The rubber heater 41 is for adjusting the temperature of or warming the water-containing material 6 in the water-containing material holder 11. The rubber heater 41 covers the outer circumferential surface 301A (outer circumferential portion) of the small-diameter portion 301 of the container body 31 and is disposed in the outer circumferential portion of the container body 31, specifically, disposed on the step portion 303 of the large-diameter portion 302. The rubber heater 41 is bonded and fixed to the outer circumferential surface 301A of the small-diameter portion 301 with, for example, an adhesive tape or any other similar material. In FIGS. 1 and 2, only a portion of the rubber heater 41 is shown in order to clearly show the hole 36 and the temperature sensor 37. The first temperature control element may be, for example, a film heater as a substitute for the rubber heater 41.

The hot plate 43 is disposed on the side of the coated metal material 1 opposite to the container 30, that is, on the steel sheet 2 of the coated metal material 1. The hot plate 43 is for adjusting the temperatures of or warming the coated metal material 1 and portion of the water-containing material 6 near the electrodeposition coating film 4 from the back side of the coated metal material 1. The second temperature control element may be, for example, a Peltier element as a substitute for the hot plate 43.

The rubber heater 41 and the hot plate 43 are electrically or wirelessly connected to the control device 9 to be described later. The control unit 93 of the control device 9 serves as a temperature controller to control the temperatures of the rubber heater 41 and the hot plate 43. In this way, the control unit 93 can be configured to adjust the temperatures of or warm the coated metal material 1 and the water-containing material 6. As described above, the rubber heater 41 and the hot plate 43 are suitably controlled by a single temperature controller. In other words, the temperature controller connected to the rubber heater 41 suitably also serves as the temperature controller connected to the hot plate 43. This contributes to the downsizing of the corrosion resistance test apparatus 100. This configuration is not intended to limit the use of devices other than the control device 9 as a temperature controller. The temperatures of the rubber heater 41 and the hot plate 43 may be controlled by different temperature controllers.

This configuration allows appropriate adjustment of the temperatures of or appropriate warming of the water-containing material 6 and the coated metal material 1. Thus, in the corrosion resistance test to be described later, movement of ions to and permeation of water into the electrodeposition coating film 4 is promoted, and corrosion of the damaged portion 5 can be effectively progressed. This allows the corrosion resistance test to be performed in a shorter time with higher reliability. Further, the temperature of the water-containing material 6 and the coated metal material 1 can be kept constant over desired testing time. This allows the corrosion resistance test to be performed under a predetermined temperature condition with higher reliability.

Either one of the rubber heater 41 or the hot plate 43 may be provided, but the hot plate 43 is preferably provided in order to accurately control the temperature of portion of the water-containing material 6 near the electrodeposition coating film 4.

Even for both the rubber heater 41 and the hot plate 43 provided, both of or either one of the temperatures of the water-containing material 6 and the coated metal material 1 may be adjusted. Both of the temperatures of the coated metal material 1 and the water-containing material 6 are suitably adjusted in order to uniformize their temperature distributions.

<<Control Device>>

The control device 9 is based on, for example, a known microcomputer, and includes an arithmetic unit 91, a storage 92, and a control unit 93. The control device 9 may further include a display unit such as a display, and an input unit such as a keyboard, although not shown. The storage 92 stores pieces of information such as various pieces of data and arithmetic processing programs. The arithmetic unit 91 performs various kinds of arithmetic processing based on the information stored in the storage 92, information input with the input unit, and other information. The control unit 93 outputs a control signal to the target to be controlled to perform various kinds of controls based on the data stored in the storage 92, an arithmetic result of the arithmetic unit 91, and the like.

As mentioned above, the control device 9 is electrically or wirelessly connected to the current supplier 8, the rubber heater 41, the hot plate 43, and the temperature sensor 37.

As mentioned above, the current supply information detected with the current supplier 8, the temperature information detected with the temperature sensor 37, and other information are transmitted to the control device 9 and is stored in the storage 92. The control unit 93 outputs a control signal to the current supplier 8, the rubber heater 41, and the hot plate 43 to control a voltage value/current value applied from the current supplier 8 to the external circuit 7 and the temperature settings of the rubber heater 41 and the hot plate 43. The control unit 93 may be configured to control the temperature settings of the rubber heater 41 and the hot plate 43 based on the temperature information detected with the temperature sensor 37. This configuration allows the temperatures to be controlled further accurately.

The arithmetic unit 91 functions as a calculator that calculates the sizes of the damaged portion 5 and the expansion of the electrodeposition coating film 4 in the first measurement step S5 and second measurement step S10, which will be described later. The storage 92 stores various pieces of information on the correlation used for the calculation and information on the sizes of the damaged portion 5 and the expansion of the electrodeposition coating film 4.

The arithmetic unit 91 functions also as a calculator that calculates the progress degree of corrosion of the coated metal material 1 in the calculation step S11 to be described later. The storage 92 further stores information on the calculated progress degree of the corrosion of the coated metal material 1.

<<First Measurement Device and Second Measurement Device>>

Although will be described in detail, the electrode 12, the external circuit 7, the current supplier 8, and the control device 9 constitute each of the first measurement device (additional measurement device) that measures the size of the damaged portion in the first measurement step S5 to be described later, and a second measurement device (measurement device) that measures the size of the expansion of the electrodeposition coating film 4 in the second measurement step S10 to be described later.

In this embodiment, the first and second measurement devices each are constituted by the electrode 12, the external circuit 7, the current supplier 8, and the control device 9, and thus have the same configuration but may have different configurations. The first and second measurement devices suitably have the same configuration in order to unify the accuracies of the measured values of both the measurement devices, improve the accuracy of calculation of the progress degree of the corrosion, and contribute to downsizing of the corrosion resistance test apparatus 100.

<<Damaged Portion Treatment Device>>

Although will be described in detail, the electrode 12, the external circuit 7, the current supplier 8, and control device 9 constitute the treatment device that cleans the damaged portion 5 in the cleaning step S4 to be described later. The corrosion resistance test apparatus 100 according to the present embodiment includes the treatment device, thereby enabling the corrosion resistance test to be performed without adherents on the surface of the damaged portion 5. Accordingly, the reliability of the corrosion resistance test can be improved.

<Corrosion Resistance Test Method>

Figure 4:
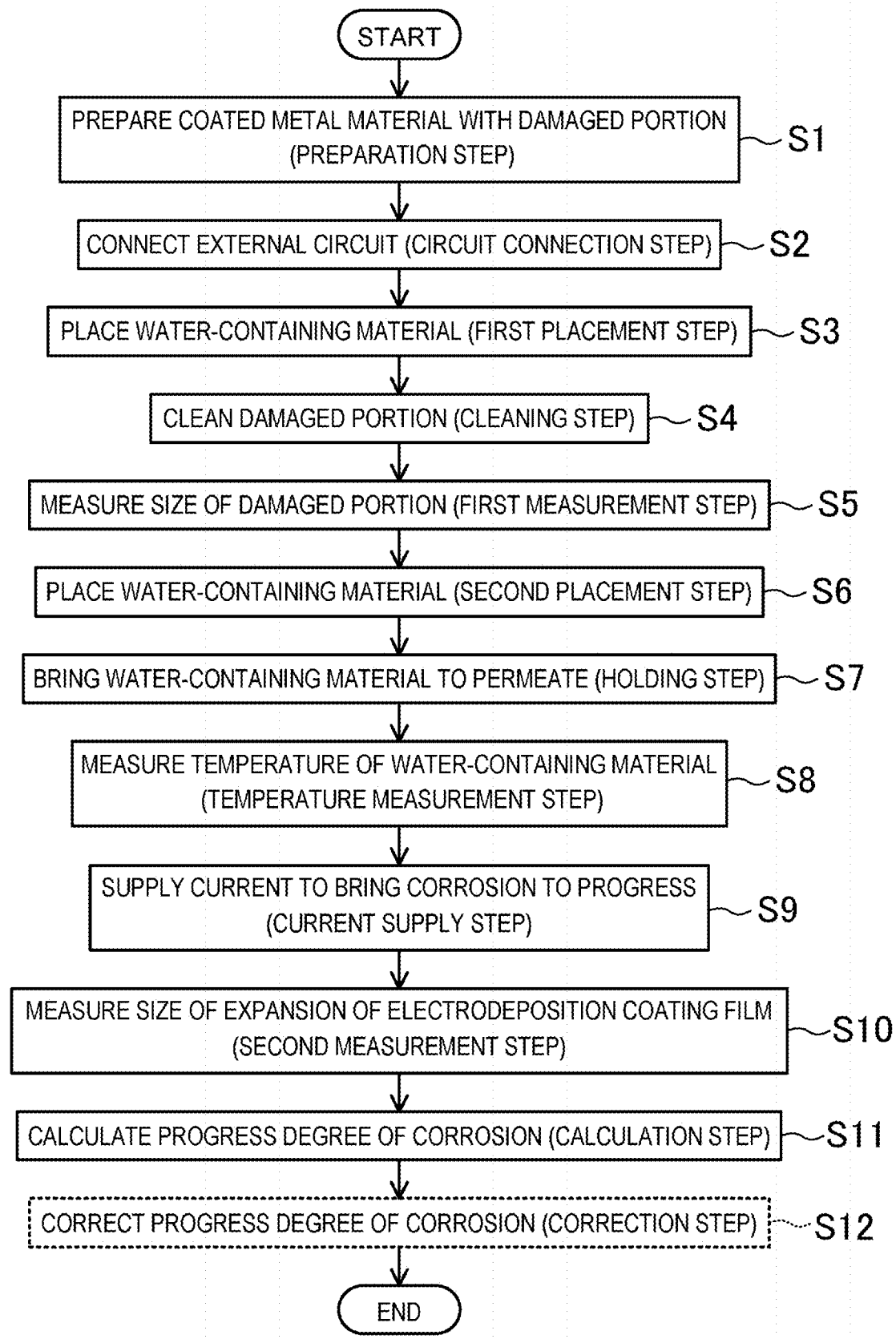
FIG. 4 is a flowchart of a corrosion resistance test method according to the first embodiment.

The corrosion resistance test method for the coated metal material 1 according to the present embodiment includes, as shown in FIG. 4, a preparation step S1, a circuit connection step S2 (connection step), a first placement step S3, an optional cleaning step S4, a first measurement step S5, a second placement step S6 (connection step), an optional holding step S7, an optional temperature measurement step S8, a current supply step S9, a second measurement step S10, a calculation step S11, and an optional correction step S12. These steps will now be described. The correction step S12 will be described in the third embodiment.

<<Preparation Step>>

In the preparation step S1, prepared is a coated metal material 1 having one damaged portion 5 reaching a steel sheet 2 through an electrodeposition coating film 4 and a chemical conversion coating 3.

In general, a coated metal material with a coating film starts to corrode after a corrosion factor such as salt water has permeated into the coating film and reached the base. The process of the corrosion of the coated metal material is divided into a stage until occurrence of the corrosion and a stage in which the corrosion progresses. The corrosion can be evaluated through determining the period until the corrosion starts (i.e., a corrosion resistance time) and the rate at which the corrosion progresses (corrosion progress rate).

If there is a damaged portion 5 reaching the steel sheet 2 through the electrodeposition coating film 4 and the chemical conversion coating 3, the water-containing material 6, when comes into contact with the damaged portion 5, enters the damaged portion 5, and comes into contact with the exposed portion of the steel sheet 2. The damaged portion 5 allows creation of the simulated state at the end of the stage until occurrence of the corrosion, that is, at the end of the corrosion resistance time, out of the process of the corrosion of the coated metal material 1. This allows information on the corrosion progress rate to be efficiently obtained in the corrosion resistance test.

As mentioned above, the damaged portion 5 may be naturally damaged portion or an artificially damaged portion, and suitably an artificially damaged portion. The artificially damaged portion 5 is allowed to be formed in a desired shape and size to some extent, for example. Thus, for example, in the cleaning step S4 to be described later, a force of hydrogen pushing up is applied to the entire damaged portion 5, so that adherents are easily removed. In addition, it becomes easy to measure the size of the damaged portion 5 in the first measurement step S5. Further, the progress of the expansion of the electrodeposition coating film 4 in the current supply step S9 is facilitated. It also becomes easy to measure the size of the expansion of the electrodeposition coating film 4 in the second measurement step S10. Accordingly, the quantitativeness and reliability of the corrosion resistance test can be improved.

The damaged portion 5 may be a dot-shaped damaged portion, a linear damaged portion such as a cut made with a cutter, but is preferably a dot-shaped damaged portion. The "dot shape" means a shape such as a circular, a polygonal, or the like in a plan view, with a ratio between the maximum width and the minimum width of 2 or less. The dot-shaped damaged portion 5 allows the electrodeposition coating film 4 to be expanded effectively in a dome shape in response to the corrosion, thereby allowing the corrosion to be accelerated.

The artificially damaged portion 5 may be formed with any kind of tool. The dot-shaped damaged portion 5 is formed preferably with an artificially damaging punch or an indenter of a Vickers hardness tester at a predetermined load in order not to vary the size and depth of the dot-shaped damaged portions 5, i.e., in order to form the dot-shaped damaged portion 5 quantitatively. For example, the linear damaged portion 5 other than the dot-shaped damaged portion 5 may be formed with a cutter or another tool.

<<Circuit Connection Step>>

Next, in the circuit connection step S2, a container 30 is disposed on the electrodeposition coating film 4 of the coated metal material 1 placed on the hot plate 43 so as for the water-containing material holder 11 to surround the damaged portion 5, as illustrated in FIGS. 1 and 2. Then, an electrode 12 connected to one end of the wiring 71 is disposed in the water-containing material holder 11 through the through hole 38. The wiring 71 has the other end connected to the steel sheet. Accordingly, the electrode 12 and the steel sheet 2 are being electrically connected to each other via an external circuit 7. A temperature sensor 37 and a rubber heater 41 are further disposed.

The water-containing material holder 11 is preferably provided to be concentric with the damaged portion 5. In the electrode 12, its distal end 12a having a hole is provided preferably to be parallel to the surface of the electrodeposition coating film 4 and to be concentric with the damaged portion 5.

<<First Placement Step>>

In the first placement step S3, the water-containing material 6 particularly used in the subsequent cleaning step S4 is placed at a predetermined amount in the water-containing material holder 11. At this time, at least the distal end 12a of the electrode 12 is being sunk in the water-containing material 6.

The water-containing material 6 contained in the water-containing material holder 11 comes into contact with the surface of the electrodeposition coating film 4, and enters the inside of the damaged portion 5.

<<Cleaning step>>

Adherents such as the electrodeposition coating film 4 and dirt on the surface of the damaged portion 5 may reduce acceleration of the corrosion in the current supply step S9 to be described later even with the damaged portion 5 reaching the steel sheet 2.

In the cleaning step S4, the current supplier 8 supplies a current between the electrode 12 and the steel sheet 2 while alternately switching the direction of the current flowing through the external circuit 7. The switching of the direction of the current using the current supplier 8 is controlled by the control device 9.

The state I in FIG. 3 illustrates the electrode 12 connected to the positive electrode side of the current supplier 8 and the steel sheet 2 connected to the negative electrode side of the current supplier 8. In the state I, the oxidation reaction progresses at the interface of the electrode 12 with the water-containing material 6. Thus, the electrode 12 serves as an anode. On the other hand, electrons $e^-$ are supplied to the damaged portion 5 via the steel sheet 2 in the exposing portion 5A of the steel sheet 2 at the damaged portion 5. Then, a cathode reaction in which dissolved oxygen and the like in water are reduced using the electrons $e^-$ to generate a hydroxyl group $OH^-$ progresses at the interface of the surface of the steel sheet 2 with the water-containing material 6. Thus, the steel sheet 2 serves as a cathode. If applied are a voltage which is equal to or higher than the theoretical voltage at which electrolysis of water occurs to generate hydrogen or a current requiring such voltage, electrolysis of water is also progressed in the steel sheet 2 to generate hydrogen.

In contract, the state II in FIG. 3 illustrates the electrode 12 connected to the negative electrode side of the current supplier 8 and the steel sheet 2 connected to the positive electrode side of the current supplier 8. In the state II, the reduction reaction progresses at the interface of the electrode 12 with the water-containing material 6. Thus, the electrode 12 serves as a cathode. On the other hand, an anode reaction in which the steel sheet 2 is dissolved progresses in the exposing portion 5A of the steel sheet 2 at the damaged portion 5. Thus, the steel sheet 2 serves as an anode.

The alternate switching of the direction of the current applied from the current supplier 8 to the external circuit 7 means alternate switching between the states I and II in FIG. 3. The alternate switching between the states I and II makes the anode reaction (state II) and the cathode reaction (state I) progress alternately at the damaged portion 5. Specific experimental examples will be described below.

Figure 5:
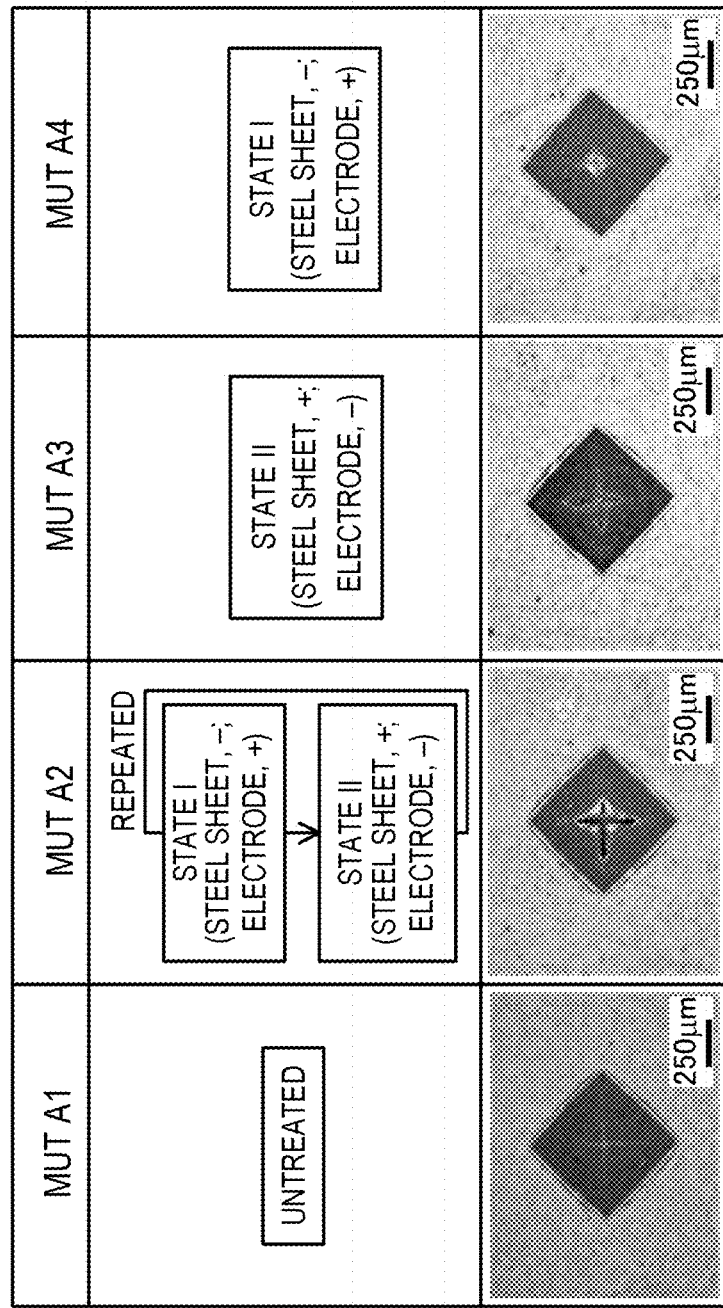
FIG. 5 is a table showing experimental results on a cleaning step.

FIG. 5 shows specific experimental results of the cleaning step S4.

First, a steel sheet 2 (SPC) serving as a metal base was provided with an epoxy resin-based electrodeposition coating film 4 (baking conditions: 150° C.×20 min, thickness: 10 µm) via a chemical conversion coating 3 (zinc phosphate coating; chemical conversion treatment time, 120 sec) to produce a coated metal material 1, which was used as materials under test (MUTs) A1 to A4. A damaged portion 5 was formed artificially in the surface of the electrodeposition coating film 4 in each of the MUTs A1 to A4 using a Vickers hardness tester with a load of 30 kg.

A photograph of the MUT A1 shown in FIG. 5 is a digital photomicrograph of the untreated MUT A1 after the formation of the damaged portion 5. As can be seen from the photograph, the electrodeposition coating film 4 is adhered to the entire surface of the damaged portion 5.

The other MUTs A2 to A4 underwent respective treatments shown in FIG. 5 using a 5 mass % salt water (at normal temperature) as a water-containing material 6 with application of a constant current of 5 mA after the damaged portion 5 was formed in the same manner as in the MUT A1.

The MUT A2 underwent the treatment (I→II→I→II→I) of repeatedly holding the state I (the steel sheet, −; the electrode, +) for 20 sec and holding the state II (the steel sheet, +; the electrode, −) for 20 sec. As can be seen from the photograph of the MUT A2 shown in FIG. 5, the electrodeposition coating film 4 on the surface of the damaged portion 5 is lifted. In the state I, the cathode reaction progresses in the damaged portion 5. This generates an alkaline environment near the damaged portion 5, thereby reducing adherence of the electrodeposition coating film 4 to the surface of the damaged portion 5, and causes hydrogen generated in the cathode reaction and electrolysis of water to push up the electrodeposition coating film 4. In the state II, the anode reaction progresses at the damaged portion 5. This slightly dissolves the surface of the steel sheet 2, and causes further reduction in the adherence of the electrodeposition coating film 4 to the surface of the damaged portion 5. Further, the alternate repeating of the states I and II reduces adherence of the electrodeposition coating film 4 to the surface of the damaged portion 5 and causes hydrogen to push up the electrodeposition coating film 4. This is considered to effectively lift the electrodeposition coating film 4.

The MUT A3 underwent the treatment of holding the state II (the steel sheet, +; the electrode, −) for 100 seconds. The MUT A4 underwent the treatment of holding the state I (the steel sheet, −; the electrode, +) for 100 seconds. As can be seen from the photographs of the MUTs A3 and A4 shown in FIG. 5, the electrodeposition coating film 4 remains adhered to the surface of the damaged portion 5. As can be seen from the foregoing, the treatment using only either one of the state I or II cannot push up the electrodeposition coating film 4 on the surface of the damaged portion 5. This is considered because for the treatment using only the state I, the adherence of the electrodeposition coating film 4 to the surface of the damaged portion 5 is large, and hydrogen is released from a broken portion of the electrodeposition coating film 4, thereby failing to contribute to the lifting of the electrodeposition coating film 4. This is further considered because for the treatment using only the state II, hydrogen is not generated although dissolution of the steel sheet 2 progresses, thereby lacking a force to push up the electrodeposition coating film 4.

As can be seen from the results of FIG. 5, supplying a current between the electrode 12 and the steel sheet 2 while alternately switching the direction of the current flowing through the external circuit 7 allows adherents on the surface of the damaged portion 5 to be easily and reliably removed in a short time. This contributes to the improvement in the reliability of the corrosion resistance test, for example.

A constant current is suitably applied between the electrode 12 and the steel sheet 2 in order to ensure stability of the treatment in the cleaning step S4.

Alternately, a current requiring a voltage which is equal to or higher than the theoretical voltage at which electrolysis of water occurs to generate hydrogen is suitably applied between the electrode 12 and the steel sheet 2. For the temperature of the water-containing material 6 being 25° C., a current requiring a voltage equal to or higher than 1.23 V which is a theoretical voltage at which electrolysis of water occurs to generate hydrogen is suitably applied. The application of such a current allows electrolysis of water to be progressed in the state I, thereby ensuring a sufficient amount of hydrogen generated. Thus, the hydrogen sufficiently pushes up the adherents and improves removability of the adherents.

Specifically, the current value is suitably more than 1 mA and less than 20 mA. The current value of 1 mA or less may require a long period of time for removing the adherents, and may cause progress of the corrosion of the coated metal material 1. The application of the current value of 20 mA or higher corresponds to the application of a voltage of 25 V or higher, and may, particularly if the electrodeposition coating film 4 has a low film quality, accelerate permeation of the water-containing material 6 into a portion of the electrodeposition coating film 4 other than the damaged portion 5, which results in breakage of insulation of the electrodeposition coating film 4.

The water-containing material 6 used in the cleaning step S4 is suitably an aqueous solution containing a supporting electrolyte. In other words, the water-containing material 6 used in the cleaning step S4 suitably does not contain a solid content such as the clay mineral mentioned above. In the cleaning step S4, a material containing a larger solid content or a material having a high viscosity used as the water-containing material 6 may deteriorate removability for adherents from the surface of the damaged portion 5 due to the weight or viscosity of the water-containing material 6. An aqueous solution free from the solid content and having a relatively low viscosity allows improvement in removability for the adherents.

In the cleaning step S4, the direction of the current is switched suitably twice or more in total. The switching from either one of the state I or II to the other is counted as a single switching of the direction of the current. Specifically, switching the direction of the current twice in total means the same as the switching from state I→state II→state I or the switching from the state II→state I→state II. In other words, the steel sheet 2 becomes cathode→anode→cathode or anode→cathode→anode by switching the direction of the current twice. In this way, at least either one of the anode reaction or the cathode reaction progresses twice or more in total on a portion of the steel sheet 2 exposed at the damaged portion 5. This improves removability for adherents from the surface of the damaged portion 5. The switching starts suitably from the state I. Slight progress of dissolution of the steel sheet 2 after a small amount of hydrogen is generated allows further reduction in adherence of the adherents to the surface of the damaged portion 5.

The time for current supply in each of the states between the switching and the subsequent switching is preferably, 1 sec or more to 60 sec or less, more preferably 3 sec or more to 45 sec or less, particularly preferably 5 sec or more to 30 sec or less. The total time for current supply in the cleaning step S4 is preferably 2 sec or more to 200 sec or less, more preferably 6 sec or more to 150 sec or less, particularly preferably 10 sec or more to 60 sec or less. The time and/or total time for current supply in each of the states less than the lower limit may cause insufficient cleaning of the damaged portion 5, and the time and/or total time exceeding the upper limit may cause progress of the corrosion of the coated metal material 1 due to the current supply time that is too long.

For the damaged portion 5 being an artificially damaged portion, the electrodeposition coating film 4 is prone to remain on the surface of the damaged portion 5. However, even if the damaged portion 5 is an artificially damaged portion, adherents on the surface of the damaged portion 5 can be effectively removed in the cleaning step S4.

<<First Measurement Step>>

The size of the damaged portion 5 before the current supply step S9 needs to be measured accurately. Measurement of the size of the damaged portion 5 by visual check using an image of the damaged portion 5 or the like increases the number of processes in the test, and may increase an error.

The first measurement step S5 is measuring the size of the damaged portion 5 using an electrochemical technique before the current supply step S9. Specifically, as the size of the damaged portion 5, the area, diameter, or another parameter of the damaged portion 5 is measured. The size of the damaged portion 5 is preferably the area of the damaged portion 5 in order to easily perform the measurement.

How to measure the size of the damaged portion 5 in the first measurement step S5 is specifically as follows. Specifically, as shown in the state II of FIG. 3, a current supplier 8 supplies a constant voltage between the electrode 12 and the steel sheet 2 serving as a cathode and an anode, respectively. The current supplier 8 then detects a current value flowing between the cathode and the anode. The current value is stored as a measured value in the storage 92 of the control device 9. The storage 92 further stores a correlation between the current value and the size of the damaged portion 5. The correlation is determined on an exploratory basis in advance. The arithmetic unit 91 calculates the size of the damaged portion 5 based on the measured current value and the correlation.

This configuration allows the size of the damaged portion 5 to be measured using the electrochemical technique; this enables the processes of the test to be simplified and a measuring error to be reduced.

Description will be made with reference to specific experimental results shown in FIGS. 6 to 8.

The inventors of the present application found that when the current supplier 8 applies a constant voltage between the electrode 12 and the steel sheet 2 serving as a cathode and an anode, respectively in the state II of FIG. 3, a current value flowing between the cathode and the anode increases linearly with respect to the size of the damaged portion 5.

First, a steel sheet 2 (SPC) serving as a metal base was provided with an epoxy resin-based electrodeposition coating film 4 (baking conditions: 150° C.×20 min, thickness: 10 μm) via a chemical conversion coating 3 (zinc phosphate coating; chemical conversion treatment time, 120 sec) to produce a coated metal material 1, which was used as a MUT B. Damaged portions 5 were formed artificially in the surfaces of the respective electrodeposition coating film 4 in the MUT B using a Vickers hardness tester.

Digital photomicrographs of the damaged portions 5 of the MUT B were taken, and the areas of the damaged portions 5 were calculated as the sizes of the respective damaged portions 5 from the digital photomicrographs.

Further, 5 mass % salt water was adhered to the damaged portions 5 in various sizes in the MUT B, and then, in the state II of FIG. 3, a constant voltage of 0.5 V was applied for 5 min, and a current value was measured.

Figure 6:
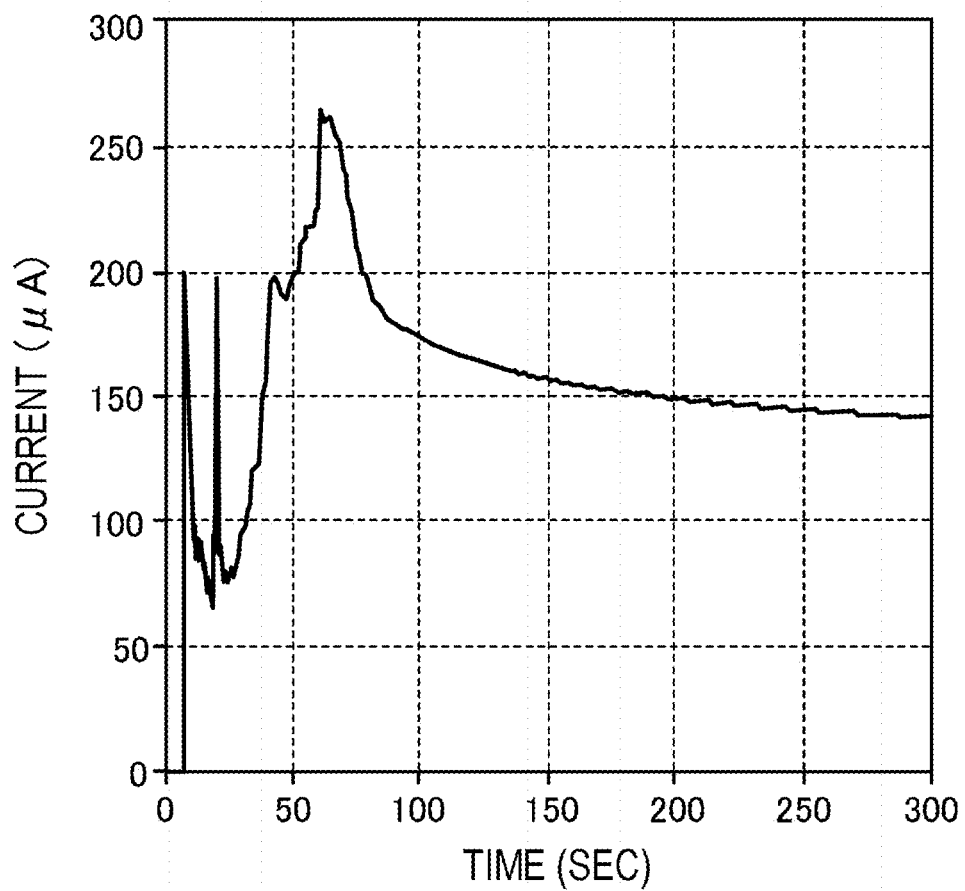
FIG. 6 is a graph showing experimental results on a first measurement step.

FIG. 6 is a graph showing change in the current value with time for the MUT B having a damaged portion 5 with an area of 0.62 mm$^2$. As can be seen from FIG. 6, a fluctuation of the current value is large from the start (0 sec) of application of the voltage to about 120 sec. This is considered to be because the rates of the chemical reaction at the interfaces of the water-containing material 6 with the electrode 12 and the steel sheet 2 is not stable for about two minutes after the application of the voltage, for example. After about 2 min from the start of the application of the voltage, the current value starts to stabilize. This is considered to be because the rate of the chemical reaction at each of the interfaces starts to stabilize. In the present experiment, the lowest current value during the period from 2 min to 5 min after the application of the voltage was regarded as the current value detected for the MUT B. For the other damaged portions 5 of the MUT B, current values were detected in the same manner Note that each of the current values detected is not limited to the lowest value during predetermined time, and may be an average or the like.

Figure 7:
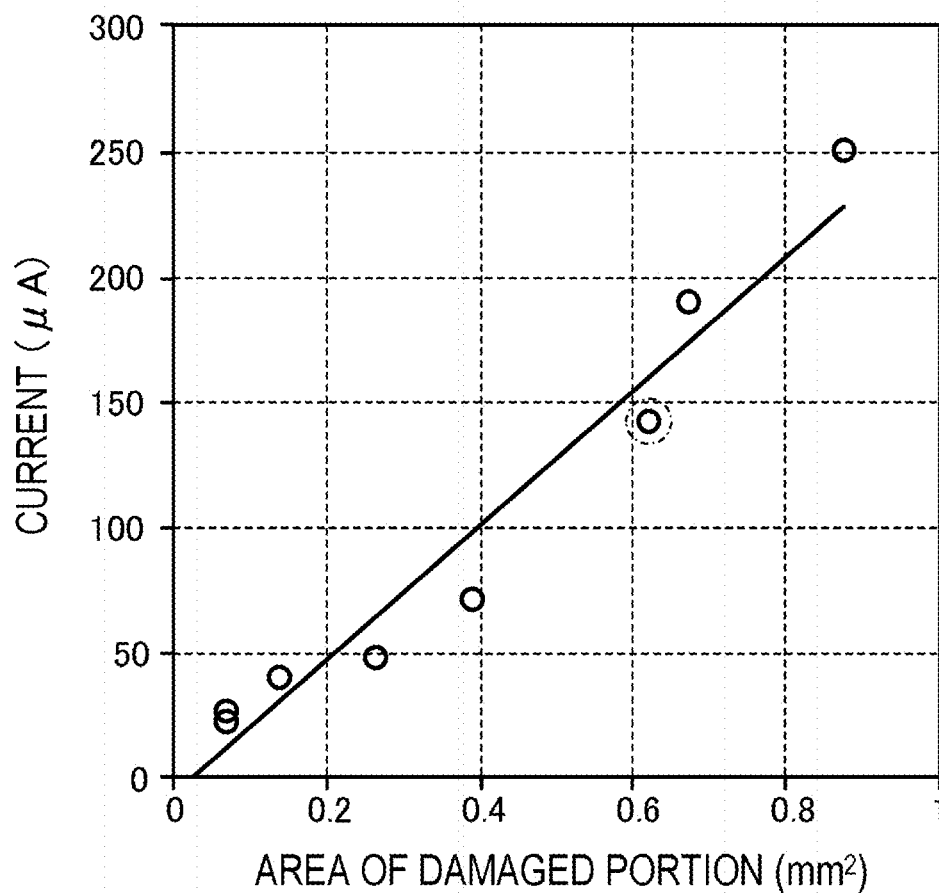
FIG. 7 is a graph showing other experimental results on the first measurement step.

FIG. 7 is a graph obtained by plotting the current values detected in the manner mentioned above against the area of the damaged portion 5. The data of the MUT B of FIG. 6 is indicated by a circle with a dot-dash line. As can be seen from FIG. 7, there is a linear correlation between the area of the damaged portion and the detected current value. The correlation shown in FIG. 7 is an example correlation between the current value and the size of the damaged portion 5, stored in the storage 92. The correlation is determined on an exploratory basis in advance.

Figure 8:
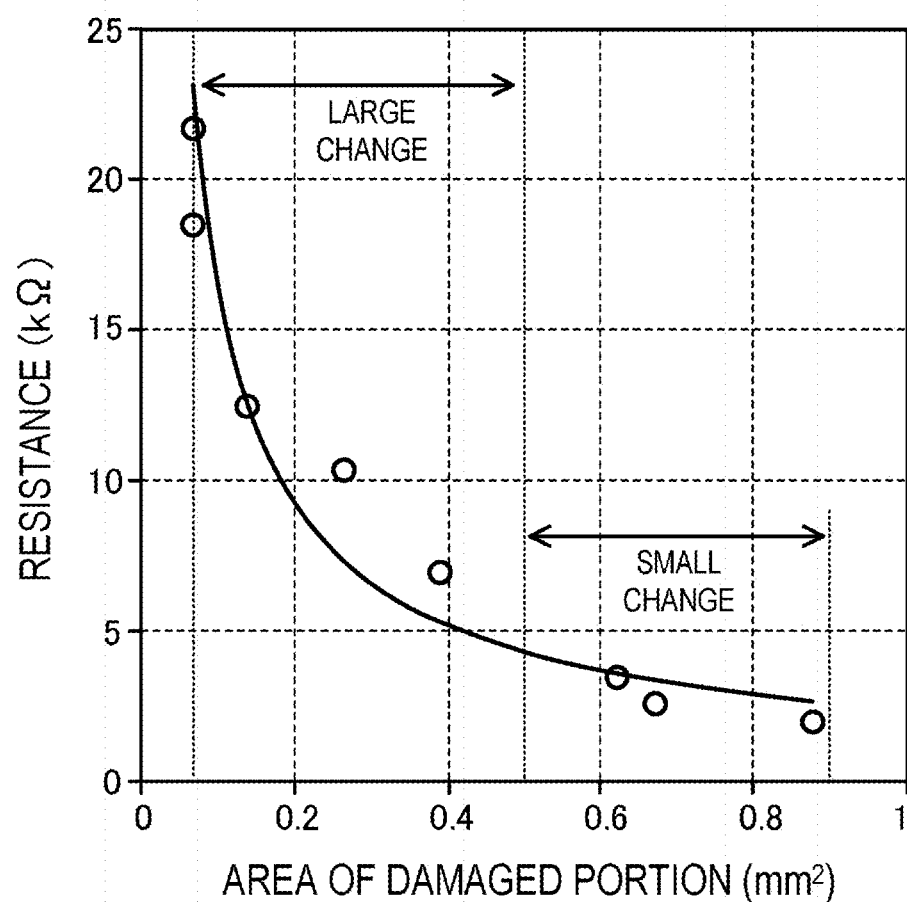
FIG. 8 is a graph showing yet other experimental results on the first measurement step.

FIG. 8 is a graph obtained by plotting resistance values detected instead of the current values against the area of the damaged portion 5. A correlation is also found between the area of the damaged portion and the resistance value, but is a non-linear correlation. Specifically, the resistance value becomes large in a region in which the area of the damaged portion 5 is small, whereas the resistance value becomes small in a region in which the area of the damaged portion 5 is large. Accordingly, if the resistance value is used instead of the current value, an error in fitting the regression equation and an error in calculation may become large.

The difference between FIGS. 7 and 8 is considered as follows, for example.

The entire system in the state II of FIG. 3 includes a plurality of interfaces such as the interface between the electrode 12 and the water-containing material 6 and the interface between the steel sheet 2 and the water-containing material 6. Then, the resistance value of the entire system does not follow what is called the Ohm's law and does not become a constant. Thus, a current value, a voltage value, or a resistance value may be detected at a constant voltage or constant current, in the steady state where the rate of the chemical reaction at each of the interfaces has been stabilized after lapse of sufficient time, and is then used to measure the size of the damaged portion 5.

For example, it is assumed that in the steady state where the rate and other factors of the chemical reaction at each of the interfaces are stable, the entire system is regarded as a single resistance, and a current value, a voltage value, a resistance value, and a resistivity, the length of the resistance, and the cross-sectional area of the resistance satisfy the following equations (1) and (2) of the Ohm's law. If the entire system is regarded as the resistance, R represents a resistance value, I represents a current value, V represents a voltage value, ρ (constant) represents a resistivity of the entire system, L (constant) represents a length of the entire system, and S represents a cross-sectional area of the entire system, in the equations (1) and (2).

$$V = I \times R \quad (1)$$

$$R = \rho \times L/S \quad (2)$$

Equations (1) and (2) derive equations (3) and (4).

$$I = [V/(\rho \times L)] \times S \quad (3)$$

$$V = I \times \rho \times L/S \quad (4)$$

As can be seen from the equation (2), the resistance value R is inversely proportional to the cross-sectional area S at each of a constant voltage or a constant current.

As can be seen from the equation (3), the current value I is proportional to the cross-sectional area S at a constant voltage.

As can be seen from the equation (4), the voltage value V is inversely proportional to the cross-sectional area S at a constant current.

The cross-sectional area S of the entire system is considered to have a linear correlation with the area of the damaged portion 5 if other conditions such as the components, concentration, and other parameters of the water-containing material 6 are the same. Thus, it is predicted that correlations of the area of the damaged portion 5 with the resistance value R, a current value I at a constant voltage, and a voltage value V at a constant current also follow the equations (2), (3), and (4). Specifically, the area of the damaged portion 5 is considered to have a non-linear correlation with the resistance value R and the voltage value V at a constant current, whereas the area of the damaged portion 5 is considered to have a linear correlation with the current value I at a constant voltage. Accordingly, in order to improve accuracy of measurement, the area of the damaged portion 5 is measured suitably based on the current value detected at the constant voltage.

For the diameter of the damaged portion 5 measured as the size of the damaged portion 5, a correlation between the current value and the diameter of the damaged portion 5 such as shown in FIG. 7 may be determined on an exploratory basis in advance and stored in the storage 92 to be used in calculation of the diameter of the damaged portion 5.

In the first measurement step S5, the constant voltage to be applied is suitably a voltage less than the theoretical voltage at which electrolysis of water occurs to generate hydrogen. For the temperature of the water-containing material 6 being 25° C., a voltage less than 1.23 V which is a theoretical voltage (25° C.) at which electrolysis of water occurs to generate hydrogen is suitably applied.

In response to the application of a constant voltage which is equal to or higher than the theoretical voltage at which electrolysis of water occurs to generate hydrogen, electrolysis of water progresses along with the cathode reaction at the electrode 12. With the progress of the electrolysis of water, an energy loss occurs due to the generation of hydrogen. Further, the current value may be unstable due to attachment of bubbles of hydrogen to the electrode 12 arising from the size and shape of the electrode 12, for example. The application of the constant voltage less than the theoretical voltage at which electrolysis of water occurs to generate hydrogen enables a reduction in the generation of hydrogen, thereby improving accuracy of measurement of the size of the damaged portion 5.

The lower limit of the constant voltage may be preferably 0.05 V or more, more preferably 0.1 V or more. The constant voltage less than the lower limit causes a too small current value, which may cause a larger measuring error.

In the first measurement step S5, a voltage is applied suitably in the state II (the steel sheet: +, the electrode: −) of FIG. 3. If a voltage is applied in the state I (the steel sheet, −; the electrode, +) of FIG. 3, the cathode reaction progresses at the damaged portion 5 although a current flows. Thus, corrosion of the coated metal material 1 progresses before the current supply step S9. This may reduce the reliability of the corrosion resistance test. Specifically, if a voltage exceeding the theoretical voltage at which electrolysis of water occurs is applied in the state I (the steel sheet, −; the electrode, +) of FIG. 3, the electrolysis of water also progresses at the damaged portion 5 to generate hydrogen. This causes progress of corrosion, which is unsuitable.

The area as the size of the damaged portion 5 is preferably 0.01 $mm^2$ or more to 25 $mm^2$ or less, more preferably 0.02 $mm^2$ or more to 10 $mm^2$ or less, particularly preferably 0.05 $mm^2$ or more to 1 $mm^2$ or less. The diameter as the size of the damaged portion 5 is preferably 0.1 mm or more to 7 mm or less, more preferably 0.2 mm or more to 5 mm or less, particularly preferably 0.3 mm or more to 1.5 mm or less.

The size of the damaged portion 5 less than the lower limit causes a too small current value, which may result in insufficient correlation between the current value and the size of the damaged portion 5. The smaller the size of the damaged portion 5 is, the more the corrosion is accelerated in the current supply step S9. However, the size of the damaged portion 5 less than the lower limit reduces electrical conductivity in the current supply step S9, which makes it difficult for the cathode reaction to progress. The size of the damaged portion 5 exceeding the upper limit causes the cathode reaction in the current supply step S9 to be unstable due to the too large damaged portion 5, and causes the expansion of the electrodeposition coating film 4 to slow down. This may reduce the reliability of the corrosion resistance test. The size of the damaged portion 5 in the range described above allows the size of the damaged portion 5 to be calculated accurately and easily, and allows the corrosion resistance test to be performed in a short time with higher reliability. Further, the progress of the cathode reaction and the progress of the expansion of the electrodeposition coating film 4 are accelerated in the current supply step S9.

As the correlation between the current value and the size of the damaged portion 5, determined on an exploratory basis in advance, a correlation obtained using an experimental technique as shown in FIG. 7 or calculated by an analytical technique such as a simulation may be used.

The water-containing material 6 used in the first measurement step S5 may be, for example, any of the materials described as the water-containing material 6. For example, the water-containing material 6 used in the cleaning step S4 may be used as it is. For the use of a different water-containing material 6 in the current supply step S9, the water-containing material 6 is replaced in the subsequent second placement step S6.

<<Second Placement Step>>

In the current supply step S9, the water-containing material 6 suitably further contain a clay mineral and/or an additive besides water and a supporting electrolyte in order to accelerate permeation of the water-containing material 6 into the electrodeposition coating film 4. Thus, in the second placement step S6, the water-containing material 6 is replaced with the water-containing material 6 used in the current supply step S9.

Specifically, for example, the water-containing material 6 is aspirated through the through hole 38 shown in FIGS. 1 and 2, and new water-containing material 6 is introduced into the water-containing material holder 11.

<<Holding Step>>

Prior to the subsequent current supply step S9, the holding step S7 of holding the water-containing material 6 for a predetermined time with the water-containing material 6 being disposed on the surface of the electrodeposition coating film 4 may be provided. The predetermined time, that is, the holding time is preferably 1 min or more to 1 day or less, more preferably, 10 min or more to 120 min or less, particularly preferably 15 min or more to 60 min or less.

Holding the water-containing material 6 while being disposed on the surface of the electrodeposition coating film 4 promotes, in advance, permeation of the water-containing material 6 into the electrodeposition coating film 4. Specifically, the holding promotes, in advance, movement of ions to and permeation of water into the electrodeposition coating film 4, specifically as illustrated in a dotted pattern of FIG. 3. This means that the simulated state where the corrosion resistance time has ended is reproduced in the entire measurement target portion 4A to be closer to the actual corrosion process. Accordingly, the corrosion of the coated metal material 1 smoothly progresses in the current supply step S9, thereby allowing promotion of the progress of the expansion of the electrodeposition coating film 4 for evaluating the corrosion progress rate representing the progress of corrosion. This enables a reduction in the testing time and improvement in the reliability of the corrosion resistance test.

In the holding step S7 and the current supply step S9, the coated metal material 1 and/or water-containing material 6 are suitably warmed, or the temperatures thereof are suitably adjusted. The temperature of the coated metal material 1 and/or the water-containing material 6, preferably detected with the temperature sensor 37 in the subsequent temperature measurement step S8, is preferably 30° C. or more to 100° C. or less, more preferably 50° C. or more to 100° C. or less, particularly preferably 50° C. or more to 80° C. or less. This allows movement of ions to and permeation of water into the electrodeposition coating film 4 to be accelerated. Accordingly, the corrosion resistance test can be performed under the predetermined temperature condition with higher reliability. Specifically, for example, the control device 9 controls the temperatures of the rubber heater 41 and/or hot plate 43 to be in the range described above, thereby adjusting the temperatures of the coated metal material 1 and/or water-containing material 6.

<<Temperature Measurement Step>>

The temperature measurement step S8 is suitably performed to measure the temperature of the water-containing material 6 prior to the current supply step S9. This allows the corrosion resistance test at a desired temperature to be performed and improves the reliability of the corrosion resistance test.

Specifically, for example, the temperature information is detected with the temperature sensor 37 immediately before the current supply step S9, and is then stored in the storage 92.

<<Current Supply Step>

The current supply step S9 is a step of supplying, with a current supplier 8, a current between the electrode 12 and the steel sheet 2 serving as an anode and a cathode, respectively as shown in the state I of FIG. 3 for corrosion of the steel sheet 2 to progress around the damaged portion 5.

In response to the supply of a current between the electrode 12 serving as an anode and the steel sheet 2 serving as a cathode, the cathode reaction progresses in the exposing portion 5A of the steel sheet 2 at the damaged portion 5. Then, electrolysis of water also progresses to generate hydrogen, depending on the conditions of the current supply.

With the progress of the cathode reaction, OH$^-$ is generated. This brings the area around the damaged portion 5 to be in an alkaline environment. This damages the under-treated surface (chemically converted surface) of the steel sheet 2, thereby reducing adherence of the electrodeposition coating film 4. Accordingly, the electrodeposition coating film 4 is expanded around the damaged portion 5. Further, hydrogen gas generated by electrolysis of water and reduction of H$^+$ accelerate the expansion of the electrodeposition coating film 4.

Figure 9:
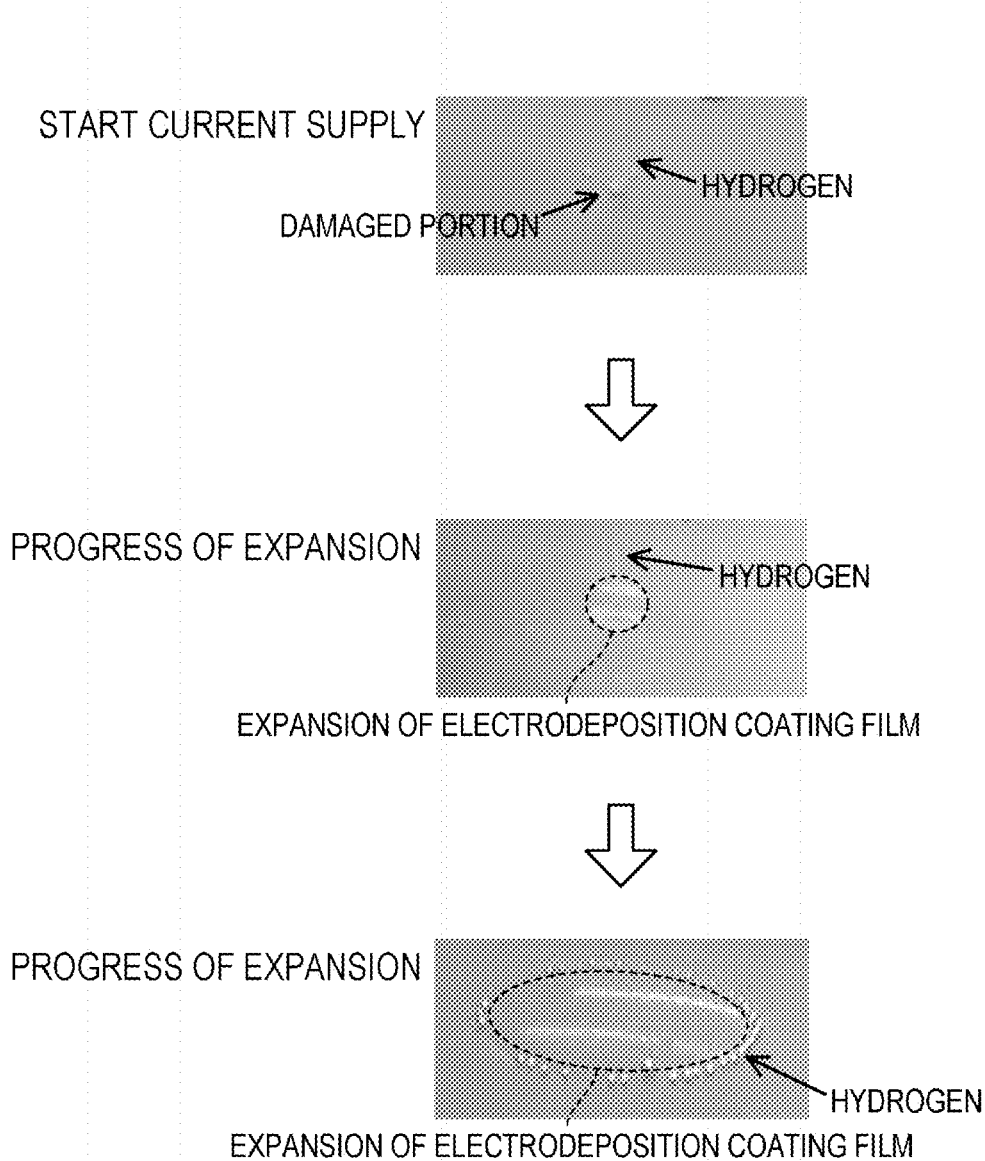
FIG. 9 illustrates how an electrodeposition coating film expands around a damaged portion.

FIG. 9 shows photographs showing progress of corrosion of the coated metal material 1 in the current supply step S9.

First, a steel sheet 2 (SPC) serving as a metal base was provided with an epoxy resin-based electrodeposition coating film 4 (baking conditions: 150° C.×20 min, thickness: 10 μm) via a chemical conversion coating 3 (zinc phosphate coating; chemical conversion treatment time, 120 sec) to produce a coated metal material 1, which was used as a MUT C. A damaged portion 5 was formed artificially in the surface of the electrodeposition coating film 4 in the MUT C using a Vickers hardness tester with a load of 30 kg.

A constant current of 1 mA was applied to the MUT C for 60 min in the state I of FIG. 3 using 5 mass % salt water as a water-containing material 6. As can be seen from FIG. 9, hydrogen starts to be generated at the damaged portion 5 upon start of the current supply, and the expansion of the electrodeposition coating film 4 progresses around the damaged portion 5 with time.

Such a progress of the cathode reaction and expansion of the electrodeposition coating film 4 around the damaged portion 5 are accelerated reproduction of actual corrosion of the coated metal material 1. Specifically, the progress of the expansion of the electrodeposition coating film 4 around the damaged portion 5 is a simulated progress of the corrosion of the coated metal material 1. In this way, the degree of progress of the corrosion of the coated metal material 1 can be evaluated by evaluation of the size of the expansion of the electrodeposition coating film 4 at the time when predetermined time has elapsed from the start of the current supply. In particular, the rate of increase in the size of the expansion of the electrodeposition coating film 4 corresponds to the corrosion progress rate, out of the process of corrosion of the metal described above. Accordingly, the rate of increase in the size of expansion of the electrodeposition coating film 4 obtained as the progress degree of corrosion of the coated metal material 1 enables accurate evaluation of the corrosion resistance related to the corrosion progress rate of the coated metal material 1.

In the current supply step S9, application of the voltage to the water-containing material 6 bring anions (e.g., Cr) and cations (Nat) in the water-containing material 6 to move toward the steel sheet 2 through the electrodeposition coating film 4. The water is then drawn with anions and cations, and permeate into the electrodeposition coating film 4.

Further, the electrode 12 disposed to surround the damaged portion 5 allows a voltage to be stably applied to the electrodeposition coating film 4 around the damaged portion 5. This leads to efficient movement of ions to and efficient permeation of water into the electrodeposition coating film 4 at the time of current supply.

The current supply accelerates movement of ions to and permeation of water into a portion of the electrodeposition coating film 4 around the damaged portion 5 in this manner Thus, the flow of the current is rapidly stabilized. Accordingly, progress of the expansion of the electrodeposition coating film 4 at the damaged portion 5 is stabilized.

In this manner, the present embodiment allows stable acceleration of the progress of the cathode reaction at the damaged portion 5 and of the expansion of the electrodeposition coating film 4. This enables the corrosion resistance test for the coated metal material 1 to be performed accurately in a really short time.

FIG. 10 is a table showing an example of a specific corrosion resistance test.

A steel sheet 2 (SPC) serving as a metal base was provided with an epoxy resin-based electrodeposition coating film 4 (thickness, 10 μm) via a chemical conversion coating 3 (zinc phosphate coating) to produce a coated metal material 1, which was used as each of MUTs D1 to D4. As shown in FIG. 10, the MUTs D1 to D4 differ from each other in the film qualities of the electrodeposition coating film 4 and the chemical conversion coating 3 due to differences in the baking conditions for the electrodeposition coating film 4 and the chemical conversion treatment time for the chemical conversion coating 3. The electrodeposition coating film 4 having a high degree of cure was evaluated as "excellent," and having a low degree of cure was evaluated as "poor." The chemical conversion coating 3 was evaluated as follows: the surface of the steel sheet 2 after the chemical conversion treatment was observed with a scanning electron microscope (SEM), and if transparency was not visually observed in a SEM image (×1500) obtained, it is evaluated as "excellent," and if observed, it is evaluated as "poor."

A damaged portion 5 was formed artificially in the surface of the electrodeposition coating film 4 in each of the MUTs D1 to D4 using a Vickers hardness tester with a load of 30 kg.

As experimental examples of the corrosion resistance test method according to the present embodiment, a constant current of 1 mA was applied to the MUTs D1 to D4 for 30 min in the state I of FIG. 3, with the water-containing material 6 having a temperature of 65° C. The water-containing material 6 used was simulated mud (composition: water, 1.2 L; kaolinite, 1 kg; sodium sulfate, 50 g; sodium chloride, 50 g; calcium chloride, 50 g).

Thereafter, the simulated mud was removed, the surface of each of the MUTs D1 to D4 was cleaned, and an expanded portion of the electrodeposition coating film 4 was removed with an adhesive tape. The peeling diameter was then measured. FIG. 10 shows digital photomicrographs of the respective surfaces of the MUTs D1 to D4 after the peeling. Regarding the corrosion resistance of each of the MUTs, the peeling diameter of 3 mm or less was evaluated as "excellent," that exceeding 3 mm and 8 mm or less was evaluated as "good," and that exceeding 8 mm was evaluated as "poor."

As Reference Examples, the MUTs D1 to D4 underwent the actual corrosion test of leaving the MUTs D1 to D4 at 50° C. and a humidity of 98% for 10 days. The expansion diameter of each of the electrodeposition coating films 4 was then measured. Regarding the corrosion resistance of each of the MUTs, the expansion diameter of 2 mm or less was evaluated as "excellent," that exceeding 2 mm and 6 mm or less was evaluated as "good," and that exceeding 6 mm was evaluated as "poor."

The MUT D1 having high film qualities of both the electrodeposition coating film 4 and the chemical conversion coating 3 had a small peeling diameter and a small expansion diameter, and thus evaluated as "excellent" in both of the Example and Reference Example.

The MUTs D2 and D3 having a low film quality of either one of the electrodeposition coating film 4 or the chemical conversion coating 3 was evaluated as "good" in both of the Examples and Reference Examples.

The MUT D4 having a low film qualities of both the electrodeposition coating film 4 and the chemical conversion coating 3 had a large peeling diameter and a large expansion diameter, and thus evaluated as "poor" in both of the Examples and Reference Examples.

As can be seen from the results shown in FIG. 10, a sufficient correlation is obtained between Examples and Reference Examples, and the corrosion resistance test method according to the present embodiment can be used as a corrosion resistance test method with higher reliability in a short time, alternative to the actual corrosion test.

In the current supply step S9, a constant current or constant voltage, suitably a constant current is applied between the electrode 12 and the steel sheet 2.

Under the constant current control, the current value varies a little at the beginning of current supply, but may be controlled to be approximately the setting value. The current supply under the constant current control stabilizes the current value directly involved in the acceleration of corrosion, thereby improving the accelerated reproducibility of corrosion. Accordingly, the reliability of the corrosion resistance test can be improved.

In contract, under the constant voltage control, the current value may vary greatly due to the degree of permeation of the water-containing material 6 into the electrodeposition coating film 4, variations in the resistance value with deterioration or rusting of the chemical conversion coating, and other factors, which is disadvantageous in accelerated reproducibility of corrosion. The holding step S7 allows acceleration of the permeation of the water-containing material 6 into the electrodeposition coating film 4 prior to the current supply step S9, which may reduce variations in the current value even under the constant voltage control. The state of progress of or the degree of corrosion in the state of corrosion progress may be determined from the plot of current (waveform of current) under the constant voltage control.

The current value in the current supply step S9 is preferably 10 μA or more to 10 mA or less, more preferably 100 μA or more to 5 mA or less, particularly preferably 500 μA or more to 2 mA or less. The current value less than 10 μA reduces accelerated reproducibility of the corrosion, and needs a long period of time for the test. On the other hand, the current value exceeding 10 mA makes the rate of the corrosion reaction unstable, which reduce the correlation with the progress of actual corrosion. Setting the current value within the range described above achieves both a reduction in the testing time and an improvement in the reliability of the test.

The time for the current supply in the current supply step S9 may be, for example, 0.05 hr or more to 24 hr or less, preferably 0.1 hr or more to 10 hr or less, more preferably 0.1 hr or more to 5 hr or less, in order to shorten the testing time while obtaining sufficient spread of the expansion of the coating film. The time for the holding step S7 may be preferably 0.1 hr or more to 1 hr or less.

<<Second Measurement Step>>

The size of the expansion of the electrodeposition coating film 4 after the current supply step S9 needs to be measured accurately. Measurement of the size by visual check using an image of the expanded portion or the like increases the number of processes, and may increase an error.

The second measurement step S10 is measuring the size of the expansion of the electrodeposition coating film 4 around the damaged portion 5 using an electrochemical technique after the current supply step S9. As the size of the expansion of the electrodeposition coating film 4, the expansion diameter or expansion area, or the peeling diameter or peeling area is measured. If the diameter of the damaged portion 5 is measured in the first measurement step S5 as the size of the damaged portion 5, the expansion diameter or peeling diameter is measured. If the area of the damaged portion 5 is measured, the expansion area or peeling area is measured.

The size of the expansion of the electrodeposition coating film 4 is measured in the second measurement step S10 suitably using the same method as used in the first measurement step S5. This is because the accuracy of the measured values obtained in both steps can be unified, and the calculation accuracy of the progress degree of the corrosion can be improved.

How to measure the size of the expansion of the electrodeposition coating film 4 in the second measurement step S10 is specifically as follows. Specifically, as shown in the state II of FIG. 3, a current supplier 8 supplies a constant voltage between the electrode 12 and the steel sheet 2 serving as a cathode and an anode, respectively. The current supplier 8 then detects a current value flowing between the cathode and the anode. The current value is stored as a detected value in the storage 92 of the control device 9. The storage 92 further stores a correlation between the current value and the size of the expansion of the electrodeposition coating film 4. The correlation is determined on an exploratory basis in advance. The arithmetic unit 91 calculates the size of the expansion of the electrodeposition coating film 4 based on the detected current value and the correlation.

This configuration allows the size of the expansion of the electrodeposition coating film 4 to be measured using the electrochemical technique; this enables the processes of the test to be simplified and a measuring error to be reduced.

Description will be made with reference to specific experimental results shown in FIGS. 11 to 13.

The inventors of the present application found that when the current supplier 8 applies a constant voltage between the electrode 12 and the steel sheet 2 serving as a cathode and an anode, respectively in the state II of FIG. 3, a current value flowing between the cathode and the anode increases linearly with respect to the size of the expansion of the electrodeposition coating film 4.

First, as a MUT E, a coated metal material 1 having the same specifications as the MUT B was prepared. Damaged portions 5 were formed artificially in the surface of the electrodeposition coating film 4 in the MUT E using a Vickers hardness tester with various loads.

Simulated mud (composition: water, 1.2 L; kaolinite, 1 kg; sodium sulfate, 50 g; sodium chloride, 50 g; calcium chloride, 50 g) was placed as a water-containing material 6 at each of the damaged portions 5 of the MUT E. A constant current of 1 mA was then applied to the MUT E for 30 min in the state I (steel sheet, −; electrode, +) of FIG. 3 at 65° C. of the water-containing material 6 in the current supply step S9.

With the simulated mud being placed at the damaged portion 5, a constant voltage of 0.5 V was further applied in the state II (the steel sheet, +; the electrode, −) of FIG. 3, and current values were then measured.

Subsequently, the simulated mud was removed, the surface of the MUT E was cleaned, and expanded portions of the electrodeposition coating film 4 were removed. Digital photomicrographs of the peeled portion were taken, and the peeling areas were calculated as the sizes of the expansions of the electrodeposition coating film 4.

FIG. 11 is a graph showing change in the current value with time obtained when a constant voltage was applied in the state II (the steel sheet, +; the electrode, −) of FIG. 3, for the MUT E having a peeling area calculated from the photograph of 3.1 mm$^2$. As can be seen from FIG. 11, a fluctuation of the current value is large from the start (0 sec) of application of the voltage to 120 sec. After about 2 min from the start of the application of the voltage, the current value starts to stabilize. This is considered to be because of the stability of the rate of the chemical reaction at each of the interfaces, as in the first measurement step S5. In the present experiment, the lowest current value during the period from 2 min to 5 min after the application of the voltage was regarded as the current value detected at the expanded portion of the MUT E. For the other expanded portions of the MUT E, current values were detected in the same manner Note that each of the current values detected is not limited to the lowest value during predetermined time, and may be an average or the like.

FIG. 12 is a graph obtained by plotting the current values measured in the manner mentioned above against the peeling area. The data of the MUT E of FIG. 11 is indicated by a circle with a dot-dash line. As can be seen from FIG. 12, there is a linear correlation between the peeling area and the measured current value, as in FIG. 7. The correlation shown in FIG. 12 is an example correlation between the current value and the size of the expansion of the electrodeposition coating film 4, stored in the storage 92. The correlation is determined on an exploratory basis in advance.

FIG. 13 is a graph obtained by plotting resistance values detected instead of the current values against the peeling area. A correlation is also found between the peeling area and the resistance value, but is a non-linear correlation, as in FIG. 8. Specifically, the resistance value becomes large in a region in which the peeling area is small, whereas the resistance value becomes small in a region in which the peeling area is large. Accordingly, if the resistance value is used instead of the current value, an error in fitting the regression equation and an error in calculation may become large.

The difference between FIGS. 12 and 13 is considered in the same manner as for the difference between FIGS. 7 and 8 in the first measurement step S5.

The entire system in the state II of FIG. 3 includes a plurality of interfaces as described above. Then, the resistance value of the entire system does not follow what is called the Ohm's law and does not become a constant. Thus, a current value, a voltage value, or a resistance value may be detected in the steady state where the rate of the chemical reaction at each of the interfaces has been stabilized after lapse of sufficient time at a constant voltage or constant current, and is then used to measure the size of the expansion of the electrodeposition coating film 4.

In the steady state where the rate of the chemical reaction at each of the interfaces has been stabilized, the equations (1) to (4) are assumed to be established as described above.

Specifically, as can be seen from the equation (2), the resistance value R is inversely proportional to the cross-sectional area S at each of a constant voltage or a constant current.

As can be seen from the equation (3), the current value I is proportional to the cross-sectional area S at a constant voltage.

As can be seen from the equation (4), the voltage value V is inversely proportional to the cross-sectional area S at a constant current.

When the electrodeposition coating film 4 is expanded, a gap between the electrodeposition coating film 4 and the steel sheet 2 is formed in its expanded portion. This gap is considered to be filled with the water-containing material 6 or components thereof. Then, an anode reaction progresses in a portion where the exposed surface of the steel sheet 2 in the expanded portion (i.e., corresponding to the peeled portion) is in contact with the water-containing material 6 or components thereof.

The cross-sectional area S of the entire system is considered to have a linear correlation with the area of the exposed portion of the steel sheet 2 in the expanded portion, that is, the expansion area and the peeling area if other conditions such as the components, concentration, and other parameters of the water-containing material 6 are the same. Thus, it is predicted that correlations of the expansion area or peeling area with the resistance value R, a current value I at a constant voltage, and a voltage value V at a constant current also follow the equations (2), (3), and (4). Specifically, the expansion area or the peeling area is considered to have a non-linear correlation with the resistance value R and the voltage value V at a constant current, whereas have a linear correlation with the current value I at a constant voltage. Accordingly, in order to improve the accuracy of measurement, the expansion area or peeling area of the electrodeposition coating film 4 is measured suitably based on the current value detected at the constant voltage.

For the expansion diameter or peeling diameter measured as the size of the expansion of the electrodeposition coating film 4, a correlation between the current value and expansion diameter or peeling diameter of the electrodeposition coating film 4 may be determined on an exploratory basis in advance as shown in FIG. 12 and stored in the storage 92 to be used in calculation of expansion diameter or peeling diameter.

In the second measurement step S10, the constant voltage to be applied is suitably a voltage less than the theoretical voltage at which electrolysis of water occurs to generate hydrogen, as in the first measurement step S5. For the temperature of the water-containing material 6 being 25° C., a voltage less than 1.23 V which is a theoretical voltage (25° C.) at which electrolysis of water occurs to generate hydrogen is suitably applied. This enables a reduction in the generation of hydrogen, thereby improving the accuracy of measurement of the size of the expansion of the electrodeposition coating film 4, as in the first measurement step S5.

The lower limit of the constant voltage may be preferably 0.05 V or more, more preferably 0.1 V or more, as in the first measurement step S5. The constant voltage less than the lower limit causes a too small current value, which may cause a larger measuring error.

In the second measurement step S10, a voltage is applied suitably in the state II (the steel sheet, +; the electrode, −) of FIG. 3, for the same reason as for the first measurement step S5. If a voltage is applied in the state I (the steel sheet, +; the electrode, −) of FIG. 3, the cathode reaction progresses at the damaged portion 5 although a current flows. Thus, corrosion of the coated metal material 1 further progresses. This may reduce the reliability of the corrosion resistance test. Specifically, if a voltage exceeding the theoretical voltage at which electrolysis of water occurs is applied in the state I (the steel sheet, −; the electrode, +) of FIG. 3, the electrolysis of water also progresses at the damaged portion 5 to generate hydrogen. This causes progress of corrosion, which is unsuitable.

The expansion area or peeling area as the size of the expansion of the electrodeposition coating film 4 is preferably 0.1 mm$^2$ or more to 200 mm$^2$ or less, more preferably 0.2 mm$^2$ or more to 150 mm$^2$ or less, particularly preferably 0.5 mm$^2$ or more to 120 mm$^2$ or less. The expansion diameter or peeling diameter as the size of the expansion of the electrodeposition coating film 4 is preferably 0.4 mm or more to 20 mm or less, more preferably 0.6 mm or more to 17 mm or less, particularly preferably 1 mm or more to 15 mm or less.

The size of the expansion of the electrodeposition coating film 4 less than the lower limit causes insufficient progress of the corrosion, which may result in a reduction of the reliability of the corrosion resistance test. The size of the expansion of the electrodeposition coating film 4 exceeding the upper limit causes too large current value, which may result in insufficient correlation with the current value. Too large expansion of the electrodeposition coating film 4 may require longer time for current supply in the current supply step S9 particularly for the coated metal material 1 with a high film quality in order to generate such a large expansion. The size of the expansion of the electrodeposition coating film 4 in the range described above allows the size of the expansion of the electrodeposition coating film 4 to be calculated accurately and easily, and allows the corrosion resistance test to be performed in a short time with higher reliability.

As the correlation between the current value and the size of the expansion of the electrodeposition coating film 4, determined on an exploratory basis in advance, a correlation obtained using an experimental technique as shown in FIG. 12 or calculated using an analytical technique such as a simulation may be used.

The water-containing material 6 used in the second measurement step S10 is not limited as long as being any of the materials described above, but is suitably the water-containing material 6 used in the current supply step S9 as it is, in order to simplify the process of the corrosion resistance test. In other words, it is suitable that after the completion of the current supply step S9, the state is changed from the state I to the state II of FIG. 3, and the second measurement step S10 is then performed.

In a gap between the electrodeposition coating film 4 and the steel sheet 2 in the expanded portion of the electrodeposition coating film 4, hydrogen may be accumulated due to the chemical reaction during the current supply. In such a case, the current value in the second measurement step S10 becomes small, which may cause an increase in the measuring error. Thus, before the second measurement step S10, a hole may be formed in the electrodeposition coating film 4 at the expanded portion to remove hydrogen.

Alternatively, regardless of the hydrogen content, the water-containing material 6 may be removed after the current supply step S9, the coated metal material 1 may then be cleaned, the electrodeposition coating film 4 in the expanded portion may thereafter be peeled off, a new water-containing material 6 may be placed, and the second measurement step S10 may then be performed.

<<Calculation Step>>

In the calculation step S11, the progress degree of the corrosion of the coated metal material 1 is calculated.

As mentioned above, checking how much the electrodeposition coating film 4 is expanded at the time when the predetermined time has elapsed since the start of current supply in the current supply step S9 allows the progress degree of corrosion of the coated metal material 1 to be obtained.

An index representing the progress degree of corrosion includes the difference between the size of the damaged portion 5 measured in the first measurement step S5 and the size of the expansion of the electrodeposition coating film 4 measured in the second measurement step S10, and the rate of expansion of the electrodeposition coating film 4, and is preferably the progress rate of expansion of the electrodeposition coating film 4. This is because the progress rate of the expansion of the electrodeposition coating film 4 corresponds to the corrosion progress rate.

The progress rate of expansion of the electrodeposition coating film 4 is calculated as follows as the progress degree of corrosion, for example. Specifically, based on the area or diameter of the damaged portion 5 measured in the first measurement step S5, the expansion area or peeling area, or the expansion diameter or peeling diameter measured in the second measurement step S10, an area of an expanded region of or an expanded distance of the electrodeposition coating film 4 during the current supply is calculated. Based on the area of an expanded region or the expanded distance, and the time for current supply in the current supply step S9, the progress rate of expansion of the electrodeposition coating film 4 is calculated.

The progress degree of corrosion calculated in the calculation step S1l can be used to evaluate the corrosion resistance of the coated metal material 1 in connection with the actual corrosion test, for example. Specifically, for example, the relationship between the progress degree of corrosion obtained in the corrosion resistance test and the corrosion progress rate obtained in the actual corrosion test are determined in advance, to allow the correspondence of the result of the corrosion resistance test with the corrosion resistance of the actual corrosion test to be checked.

Second Embodiment

Now, other embodiments according to the present disclosure will be described in detail. In the description of these embodiments, the same reference characters as those in the first embodiment are used to represent equivalent elements, and the detailed explanation thereof will be omitted.

The first embodiment is described above with reference to the case where the coated metal material 1 has a single damaged portion 5, or has a plurality of damaged portions 5 at positions apart from each other, and one of the damaged portions 5 is used.

The description of the second embodiment will be made with reference to the case where a plurality of damaged portions 5 are formed in the coated metal material 1 at positions apart from each other, and two out of these damaged portions 5 are used.

Figure 14:
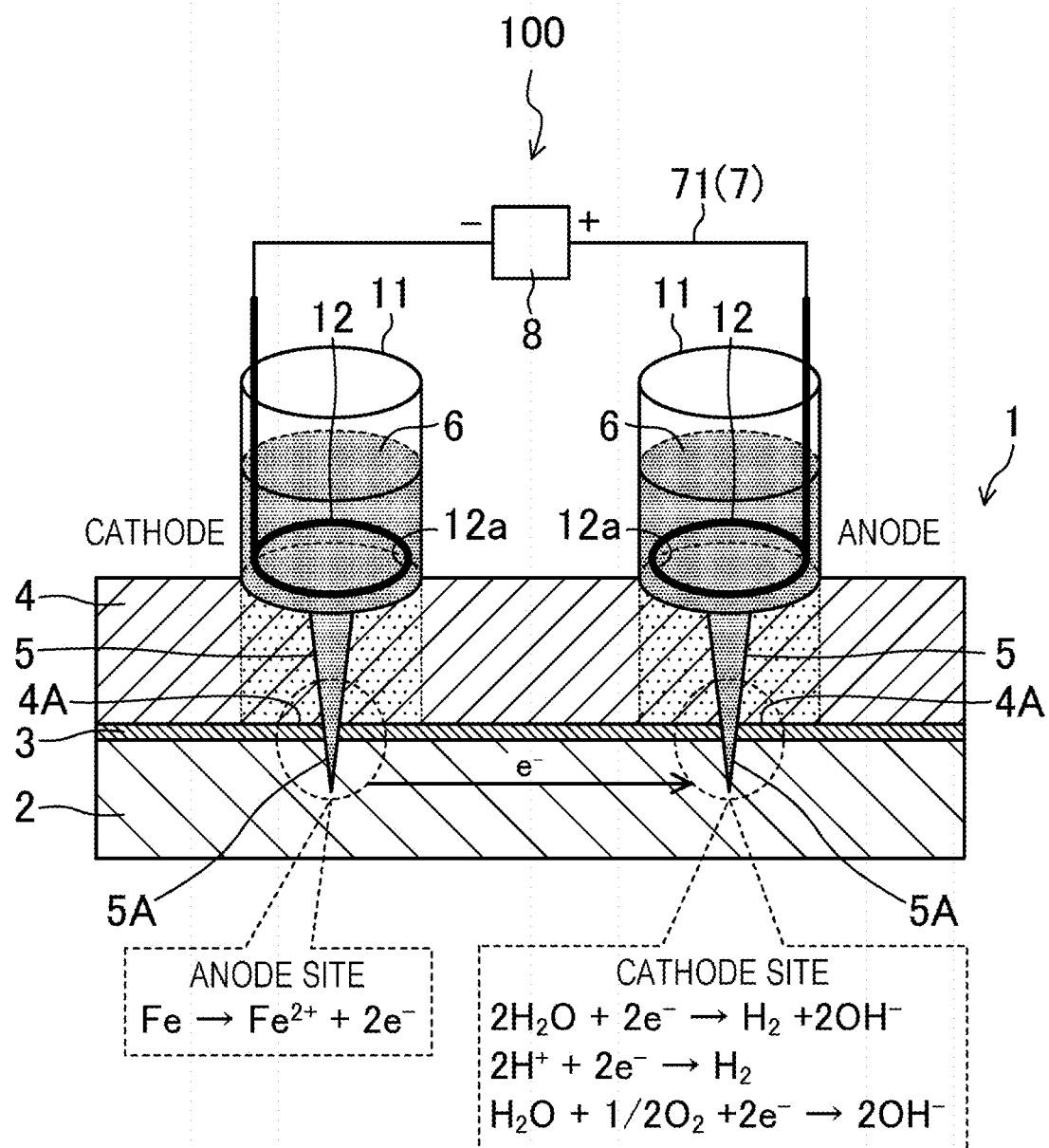
FIG. 14 illustrates the principle of a corrosion resistance test according to a second embodiment.

FIG. 14 illustrates the principle of a corrosion resistance test method according to the second embodiment, and an example corrosion resistance test apparatus.

<Corrosion Resistance Test Apparatus>

The corrosion resistance test apparatus 100 shown in FIG. 14 is configured specifically by providing two damaged portions 5 with the respective electrode portion devices 300 shown in FIGS. 1 and 2. In this case, the control device 9 may be common, or may be provided for each of the electrode portion devices 300. If provided, a first temperature control element such as a rubber heater 41 is suitably provided for each of the electrode portion devices 300. If provided, a second temperature control element such as a hot plate 43 may be provided for each of the electrode portion devices 300, or at an appropriate position for the entire electrode portion devices 300.

As illustrated in FIG. 14, the corrosion resistance test apparatus 100 of the second embodiment includes two water-containing material holders 11. The water-containing material holders 11 contain the respective water-containing materials 6. The water-containing materials 6 contained in the respective water-containing material holders 11 are in contact of the respective damaged portions 5.

The corrosion resistance test apparatus 100 of the second embodiment includes two electrodes 12. The electrodes 12 are placed in the respective water-containing material holders 11, and are in contact with the respective water-containing materials 6.

In the present embodiment, an external circuit 7 electrically connects between the electrodes 12, and is not connected directly with the steel sheet 2, which differ from the corrosion resistance test apparatus 100 according to the first embodiment.

<Corrosion Resistance Test Method>

<<Preparation Step>>

In a preparation step S1, a coated metal material 1 having at least two damaged portions 5 is prepared.

At least one of the damaged portions 5 is suitably in a dot shape. The damaged portion 5 in the dot shape in this preparation step S1 is preferably the damaged portion 5 with a larger size of expansion of the electrodeposition coating film 4 measured in the second measurement step S10 to be described later. Further, the damaged portion 5 in the dot shape is preferably the damaged portion 5 at which the cathode reaction progresses in the current supply step S9 to be described later, i.e., the damaged portion 5 serving as a cathode site. In this case, the shape of the damaged portion 5 serving as an anode site is not limited to particular shapes, and may be, for example, a linear shape such as a cut made with a cutter.

The distance between the damaged portions 5 is preferably 2 cm or more, more preferably 3 cm or more in order to easily check the expansion of the electrodeposition coating film 4.

<<Circuit Connection Step and First Placement Step>>

In the circuit connection step S2, two water-containing material holders 11 are disposed on the electrodeposition coating film 4 of the coated metal material 1 so as for the water-containing material holders 11 to surround the respective damaged portions 5, as illustrated in FIG. 14. Two electrodes 12 in connection with each other via wiring 71 are then placed in the respective water-containing material holders 11. In the first placement step S3, the water-containing materials 6 are introduced into the respective water-containing material holders 11.

In this manner, two damaged portions 5 are in electrical connection with each other using an external circuit 7 via the water-containing materials 6 in contact with the respective damaged portions 5.

<<Cleaning Step>>

In a cleaning step S4, the current supplier 8 supplies a current between the electrodes 12 while alternately switching the direction of the current flowing through the external circuit 7. Upon supply of the current between the electrodes 12, the current is supplied also to the steel sheet 2 through the water-containing materials 6.

Specifically, FIG. 14 illustrates the left electrode 12 connected to the negative electrode side of the current supplier 8, and the right electrode 12 connected to the positive electrode side of the current supplier 8. In the state of FIG. 14, the reduction reaction progresses at the interface of the left electrode 12 with the water-containing material 6. Thus, the left electrode 12 serves as a cathode. Further, the left damaged portion 5 is in contact with the same water-containing material 6 as in contact with the left electrode 12. Thus, the anode reaction progresses in the exposing portion 5A of the steel sheet 2 at the left damaged portion 5. In other words, the left damaged portion 5 serves as an anode site.

Electrons e⁻ generated by the anode reaction at the anode site move to the right damaged portion 5 through the steel sheet 2. Then, the exposing portion 5A of the steel sheet 2 at the right damaged portion 5 is in contact with the water-containing material 6, and the cathode reaction thus progresses. In other words, the right damaged portion 5 serves as a cathode site. Further, the water-containing material 6 in contact with the right damaged portion 5 is also in contact with the right electrode 12. Thus, the oxidation reaction progresses at the interface of the right electrode 12 with the water-containing material 6. Accordingly, the right electrode 12 serves as an anode.

At the damaged portion 5 serving as the cathode site, the cathode reaction progresses, and the state is thus similar to the state I of FIG. 3. At the damaged portion 5 serving as the anode site, the anode reaction progresses, and the state is thus similar to the state II of FIG. 3.

Then, the direction of the current flowing through the external circuit 7 is alternately switched to alternately switch between the state of FIG. 14 and the reversed state thereof. In other words, if the direction of the current is switched twice in total from the state of FIG. 14, the left damaged portion 5 becomes an anode site→a cathode site→an anode site. On the other hand, the right damaged portion 5 becomes a cathode site→an anode site→a cathode site. Then, adherents on the two damaged portions 5 can be simultaneously removed. This improves the treatment efficiency in the cleaning step S4.

In this case, one of the damaged portions 5 is necessarily the anode site at first. Thus, the number of times the switching is performed is suitably three or more in total in order to ensure sufficient removability of adherents on the damaged portions 5.

Further, in order to improve stability of the treatment, the electrodes 12 and the steel sheet 2 are suitably connected via the external circuit 7 to treat the damaged portions 5, in the same manner as in the first embodiment.

<<First Measurement Step>>

With the external circuit 7 connected to the electrodes 12, one of the damaged portions 5 serves as an anode site, and the other damaged portion 5 serves as a cathode site, as illustrated in FIG. 14.

A first measurement step S5 may be performed in this state, but the first measurement step S5 is preferably performed in the same manner as in the first embodiment.

As mentioned above, at the damaged portion 5 serving as a cathode site, the corrosion may progress. In addition, a current which a smaller damaged portion 5 out of the two damaged portions 5 can tolerate may only flow. Thus, if the difference in size between the damaged portions 5 is large, the accuracy of measurement of the size of the larger damaged portion 5 may decrease.

Accordingly, the first measurement step S5 of the present embodiment is suitably similar to that of the first embodiment. Specifically, the external circuit 7 is changed from connecting between two electrodes 12 to connecting between the electrodes 12 and the steel sheet 2. Then, in the same manner as in the first embodiment, the sizes of the two damaged portions 5 are measured.

<<Second Placement Step>>

In a second placement step S6, the external circuit 7 returns to connecting between the electrodes 12 and an operation similar to that in the first embodiment is performed.

<<Temperature Measurement Step>>

In a temperature measurement step S8, the temperatures of both of the water-containing materials 6 may be measured. Particularly, the temperature of the water-containing material 6 at the damaged portion 5 serving as a cathode site (the electrode 12 on the anode side) is suitably measured.

<<Current Supply Step>>

In a current supply step S9, a current is supplied between one of the electrodes serving as an anode and the other electrode serving as a cathode to bring corrosion of the coated metal material to progress.

As mentioned above, for example, in the state of FIG. 14, the left electrode 12 serves as a cathode, and the right electrode 12 serves as an anode. The left damaged portion 5 serves as an anode site, and the right damaged portion 5 serves as a cathode site.

The damaged portion 5 serving as an anode site is in the state similar to the state II of the damaged portion 5 shown in FIG. 3, as mentioned above. At the damaged portion 5 serving as an anode site, the anode reaction progresses, and the progress of the cathode reaction is reduced. Thus, the electrodeposition coating film 4 hardly expands.

On the other hand, the damaged portion 5 serving as a cathode site is in the state similar to the state I of the damaged portion 5 shown in FIG. 3, as mentioned above. At the damaged portion 5 serving as a cathode site, expansion of the electrodeposition coating film 4 progresses. In this way, the progress degree of the corrosion of the coated metal material 1 can be evaluated by evaluation of the size of the expansion of the electrodeposition coating film 4 at the cathode site at the time when predetermined time has elapsed.

The cathode reaction may progress also at the anode site depending on the size, shape, and other parameters of the damaged portions 5, and conditions in current supply with the current supplier 8 such as a current value. Specifically, in the present embodiment, the damaged portion 5 at which the anode reaction progresses, and the damaged portion 5 at which the cathode reaction progresses out of two damaged portions 5 are suitably separated, but may not be separated clearly. In this case, the expansion of the electrodeposition coating film 4 may progress also at the anode site. In such a case, the expansion of the electrodeposition coating film 4 may progress at both of the damaged portions 5. Thus, in the calculation step S11 to be described later, the progress degree of corrosion of the coated metal material 1 is calculated based on the damaged portion 5 with larger expansion of the electrodeposition coating film 4.

In this manner, the present embodiment allows separation between the anode site at which the anode reaction progress with the current supply, and a cathode site at which the cathode reaction progresses with the current supply, and further allows stable acceleration of the progress of both reactions at the respective damaged portions 5 and of the progress of the expansion of the electrodeposition coating film 4. This enables a corrosion resistance test for the coated metal material 1 to be performed accurately in a really short time.

A constant current or constant voltage, suitably a constant current is applied between the electrodes 12 as in the first embodiment.

The current value flowing between the electrodes 12 is suitably similar to that of the first embodiment.

<<Second Measurement Step>>

A second measurement step S10 according to the present embodiment may be performed with the external circuit 7 connected between the two electrodes 12, but is performed suitably in the same manner as in the second measurement step S10 of the first embodiment for the same reason as for the first measurement step S5.

Specifically, the external circuit 7 is changed from connecting between two electrodes 12 to connecting between the electrodes 12 and the steel sheet 2. Then, in the same manner as in the first embodiment, the sizes of the expansions of the electrodeposition coating film 4 are measured.

If the expansion of the electrodeposition coating film 4 at the cathode site is obviously larger than that at the anode site, the size of the expansion of the electrodeposition coating film 4 at the cathode site may only be measured. If the electrodeposition coating film 4 is expanded at both of the cathode site and anode site, the sizes of the expansion at the both may be measured and compared to select the larger size.

<<Calculation Step>>

The progress degree of corrosion of the coated metal material 1 may be calculated based on the size of the damaged portion 5 at the cathode site and the size of the expansion of the electrodeposition coating film 4. If the electrodeposition coating film 4 is expanded at both of the anode site and cathode site, the progress degree of corrosion of the coated metal material 1 may be calculated based on the size of the damaged portion 5 at the site with larger expansion of the electrodeposition coating film 4 and the size of the expansion.

Third Embodiment

In the present embodiment, the following correction step S12 may be performed.

<<Correction Step>>

A variation in the size of the damaged portion 5 before the current supply step S9 causes a variation in the progress degree of the cathode reaction and electrolysis of water which progress at the damaged portion 5, the degree of closure of the damaged portion 5 due to expansion of the electrodeposition coating film 4, the degree of degassing of hydrogen generated in the expansion of the electrodeposition coating film 4, and other factors. This further causes a variation in the size of the expansion of the electrodeposition coating film 4, resulting in a reduction of the reliability of the corrosion resistance test. However, it is difficult to prepare coated metal materials 1 having damaged portions 5 with exactly the same size in order to reduce such variations.

In a correction step S12, the progress degree of corrosion calculated in the calculation step S11 is corrected based on the size of the damaged portion 5 before the current supply step S9.

Specifically, for example, the correction step S12 is performed to correct the progress degree of the corrosion of the coated metal material 1 calculated in the calculation step S11, based on the size of the damaged portion 5 measured in the first measurement step S5 and a correlation between the size of the damaged portion 5 and the progress degree of the corrosion of the coated metal material 1. The correlation is determined on an exploratory basis in advance.

In the correction step S12, the arithmetic unit 91 of the control device 9 functions as a corrector to correct the progress degree of the corrosion of the coated metal material 1. The storage 92 further stores information on the corrected progress degree of the corrosion of the coated metal material 1.

Figure 15:
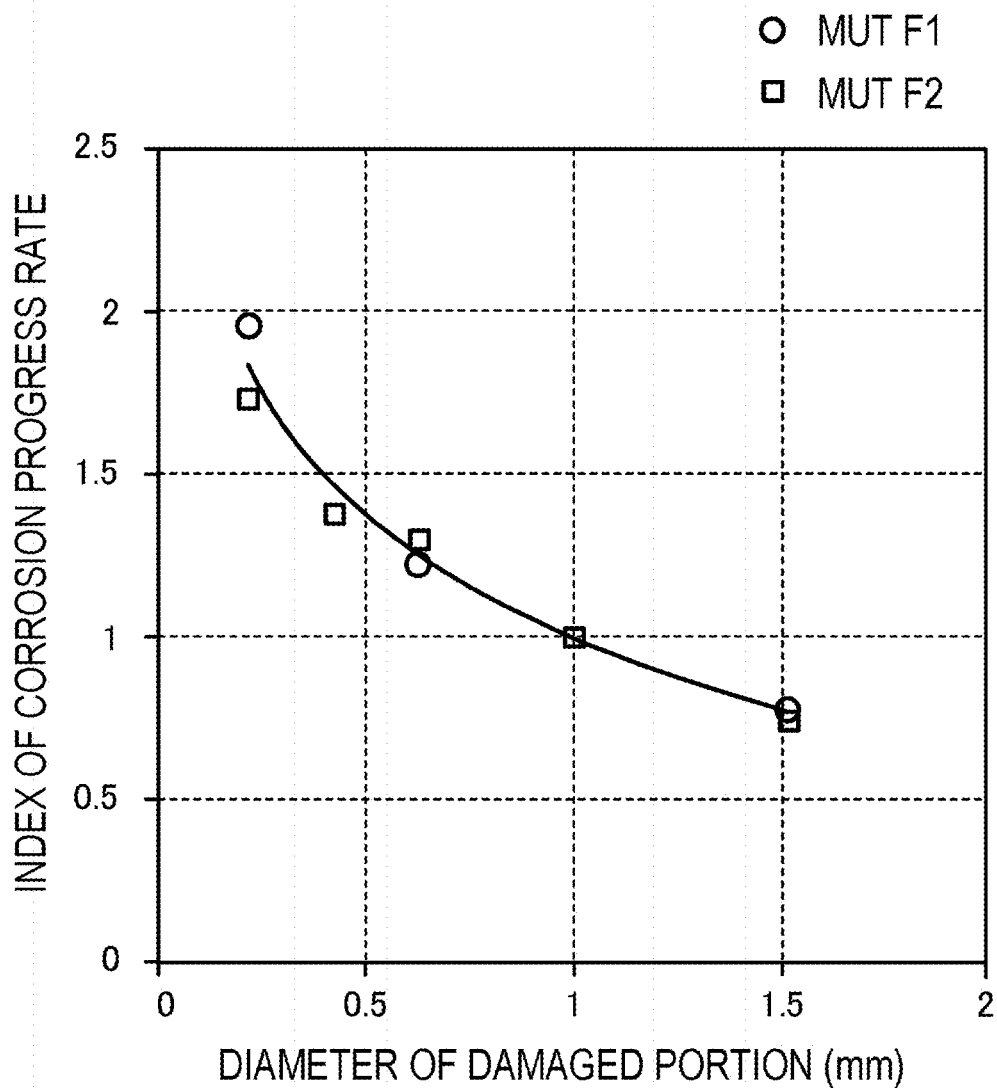
FIG. 15 is a graph showing a relationship between the diameter of a damaged portion and an index of the corrosion progress rate in a corrosion resistance test according to a third embodiment.

Specifically, the second embodiment will be described with reference to the case where the progress rate of the expansion of the electrodeposition coating film 4, i.e., the corrosion progress rate is employed as the progress degree of corrosion. FIG. 15 is a graph showing a relationship between the diameter of each of damaged portions 5 in MUTs F1 and F2 and an index of the corrosion progress rate in the corrosion resistance test of experimental examples to be described later. Note that the "index of the rate of corrosion progress" is a ratio of the corrosion progress rate with respect to the rate of corrosion progress in the case where the diameter of the damaged portion 5 is 1 mm.

As illustrated in FIG. 15, the corrosion progress rate increases with the decrease in the diameter of the damaged portion 5 in each of the MUTs F1 and F2 from 1.5 mm to 0.2 mm. This indicates that the smaller the diameter of the damaged portion 5, the more the corrosion is accelerated. In other words, the larger the diameter of the damaged portion 5, the lower the corrosion progress rate becomes, i.e., the lower the accelerated reproducibility of corrosion becomes. This is considered to be mainly caused by an increase in the area of the exposing portion of the steel sheet 2 at the damaged portion 5 due to an increase in the diameter of the damaged portion 5. With the increase in the area of the exposing portion of the steel sheet 2, an electrochemical reaction (generation of hydrogen due to reduction of hydrogen ions) which is not involved directly in the expansion of the electrodeposition coating film 4 is promoted, which may increase the waste of electrical energy supplied with the current supplier 8.

A regression equation calculated from the results in the MUTs F1 and F2 is represented by a curve (R2=0.97) indicated by a solid line in FIG. 15. This regression equation is an example of the correlation mentioned above. As described above, the correlation between the size of the damaged portion 5 and the corrosion progress rate can be determined on an exploratory basis in advance using an experimental technique or analytical technique such as a simulation. As the correlation, information on the regression equation indicated by a solid line in FIG. 15 may be stored in the storage 92 and used for correction.

The correlation described above may be used as a correction factor corresponding to the size of the damaged portion 5. Specifically, for example, information on a correction factor corresponding to the predetermined size of the damaged portion 5, calculated from the regression equation such as shown in FIG. 15 may be stored in the storage 92 and used for correction. The correction factor is, for example, an index of the corrosion progress rate on the regression equation, corresponding to the predetermined diameter of the damaged portion 5 in the example of FIG. 15. Specifically, for example, in FIG. 15, the correction factor is 1 at 1 mm of the diameter of the damaged portion 5, and is 1.5 at 0.4 mm of the diameter of the damaged portion 5. Such a correction factor is calculated for the damaged portion 5 with a diameter in 0.1 mm increments and may be used for correction. The correction factor corresponding to the size of the damaged portion 5 calculated in advance as the correlation makes the correction easy. Accordingly, the corrosion resistance test with high reliability and versatility can be performed with a simple configuration.

As a specific example, it is assumed that the diameter of the damaged portion 5 measured in the first measurement step S5 is 0.4 mm, the corrosion progress rate calculated in the calculation step S11 is 1.5 mm/h. Further, the correction factor is used as the correlation, and for example, the correction factor is 1 at 1 mm of the diameter of the damaged portion 5, and is 1.5 at 0.4 mm of the diameter of the damaged portion 5. In this case, the arithmetic unit 91 corrects the corrosion progress rate of 1.5 mm/h to 1 mm/h by dividing 1.5 mm/h by 1.5 which is a correction factor, based on information on the diameter of the damaged portion 5 being 0.4 mm and information on the correction factor being 1.5 at 0.4 mm of the diameter of the damaged portion 5 read out from the storage 92.

The correction step S12 allows accurate evaluation of the progress degree of corrosion of the coated metal material 1 regardless of the size of the damaged portion 5 where the cathode reaction progresses, measured before the current supply. Accordingly, the reliability and versatility of the corrosion resistance test can be enhanced.

Experimental Examples

[Corrosion Resistance Test]

As shown in Table 2, two kinds of MUTs which differ from each other in paint of the electrodeposition coating film 4 and the electrodeposition baking condition were prepared as MUTs F1 and F2.

TABLE 2

|  | Material Under Test | |
| --- | --- | --- |
|  | F1 | F2 |
| Electrodeposition Baking Conditions | 160° C. × 10 min | 140° C. × 20 min |
| Diameter of Damaged Portion (mm) | 0.2 | 0.2 |
|  | — | 0.42 |
|  | 0.6 | 0.6 |
|  | — | 1 |
|  | 1.5 | 1.5 |
| Temperature (° C.) | 65 | 65 |
| Holding Time (min) | 30 | 30 |
| Time for Current Supply (hr) | 0.5 | 0.5 |

Each of the MUTs F1 and F2 uses a steel sheet 2 as a metal base, and a zinc phosphate coating (chemical conversion treatment time, 120 sec) as a chemical conversion coating, and an electrodeposition coating film 4 with a thickness of 10 μm. The MUTs F1 and F2 underwent the corrosion resistance test according to the present embodiment in the configuration shown in FIG. 14.

In each of the MUTs F1 and F2, two damaged portions 5 with the same diameter reaching the steel sheet 2 were formed at a distance of 4 cm from each other using a Vickers hardness tester. Specifically, as shown in Table 2, for MUT F1, three kinds of samples each having two damaged portions 5 with a diameter of 0.2 mm, 0.6 mm, or 1.5 mm were prepared. For MUT F2, five kinds of samples each having two damaged portions 5 with a diameter of 0.2 mm, 0.42 mm, 0.6 mm, 1 mm, or 1.5 mm were prepared.

The water-containing material 6 used was simulated mud obtained by mixing 50 g of sodium chloride as a supporting electrolyte, 50 g of calcium chloride, 50 g of sodium sulfate, and 1000 g of kaolinite as a clay mineral with respect to 1.2 L of water. The electrode 12 used was a ring-shaped perforated electrode (made from platinum) with an outer diameter of about 12 mm and an inner diameter of about 10 mm A hot plate was disposed below the steel sheet 2, and the steel sheet 2 and the water-containing material 6 were warmed to 65° C.

A current value supplied with the current supplier 8 was 1 mA. The water-containing material 6 being placed on the surface of the electrodeposition coating film 4 was held for 30 min, and then a current was supplied. The time for the current supply was 0.5 hr.

After the end of the current supply, the corrosion progress rate illustrated in FIG. 15 was calculated for each of the MUTs by the method mentioned above.

Fourth Embodiment

In the embodiments described above, the first measurement step S5 is measuring the size of the damaged portion 5 using an electrochemical technique, but is not limited thereto.

Specifically, for example, the size of the size of the damaged portion 5 may be measured based on image data on the surface of the coated metal material 1.

Specifically, the first measurement device may include an image detector for acquiring image data on the surface of the coated metal material 1, i.e., the electrodeposition coating film 4. Specific examples of the image detector include a camera such as a CCD camera, a digital microscope, an optical microscope, and an electron microscope. The image detector takes an image of the damaged portion 5 before the current supply step S9 in the first measurement step S5.

In this case, the image detector may be electrically or wirelessly connected to the control device 9. The image data acquired with the image detector is transmitted to the control device 9 and stored in the storage 92. The arithmetic unit 91 measures the size of the damaged portion 5 on the image data. This configuration uses image data acquired with the image detector, and thus enables accurate measurement of the size of the damaged portion 5. Note that the control device 9 may also be configured to output a control signal to an image detector to control the timing of taking an image with a camera.

Fifth Embodiment

In the embodiments described above, the measurement target portion 4A of the coated metal material 1 has a damaged portion 5 reaching the steel sheet 2 through the electrodeposition coating film 4 and the chemical conversion coating 3, but the damaged portion 5 may not reach the steel sheet 2. The measurement target portion 4A may not have a damaged portion 5.

In this case, for example, when the water-containing material 6 is permeated through the electrodeposition coating film 4 and then reaches the steel sheet 2, a cathode reaction (state I) or an anode reaction (state II) progresses in a contact portion between the water-containing material 6 and the steel sheet 2 in the measurement target portion 4A shown in FIG. 3. Specifically, if the damaged portion 5 does not reach the steel sheet 2, or no damaged portion 5 is formed, the end of the corrosion resistance time is considered to be when the water-containing material 6 first reaches the steel sheet 2 after permeating through the electrodeposition coating film 4. Upon contact of the water-containing material 6 with the steel sheet 2, corrosion starts to occur. Then, the corrosion progresses from a portion where the corrosion first occurs, and the corrosion progress rate is calculated based on the size of the expansion of the electrodeposition coating film 4. The coated metal material 1 suitably has a damaged portion 5, particularly reaching the steel sheet 2, in order to accelerate corrosion from the desired position.

For the coated metal material 1 having no damaged portion 5, the cleaning step S4 and first measurement step S5 are unnecessary. In this case, for example, the size of the expansion of the electrodeposition coating film 4 occurred in the current supply step S9 may be measured in the second measurement step S10, and the progress degree of corrosion may be calculated based on the size.

Other Embodiments

The electrode portion device 300 and the corrosion resistance test apparatus 100 shown in FIGS. 1 and 2 are mere examples, and the configurations of the electrode portion device and the corrosion resistance test apparatus are not limited to those of FIGS. 1 and 2 as long as the principle of the corrosion resistance test method shown in FIGS. 3 and 14 and described in the embodiments are implementable.

The embodiments described above each include a control device 9 connected electrically or wirelessly to various detectors and targets to be controlled, but the corrosion resistance test method according to the present disclosure may be performed with other units. Specifically, for example, current supply information of the current supplier 8, temperature information of the temperature sensor 37, image data of the image detector, and other information may be read by the user into another computer to perform the process.

In the embodiments described above, for example, a single control device 9 functions as a calculator in the first measurement step S5, second measurement step S10, and calculation step S11, but, for example, different control devices may be used as units for the respective steps. A single control device 9 suitably functions to perform multiple roles in order to improve accuracy of the results of calculation with the control device 9 and contribute to the downsizing of the corrosion resistance test apparatus 100.

The adjustment of the temperatures of the coated metal material 1 and the water-containing material 6 is not limited to the configurations of the embodiments described above. For example, the electrode portion device 300 may be introduced into a furnace to adjust the temperatures.

The second placement step S6 may be performed prior to the first measurement step S5. For the current supply step S9 and second measurement step S10 using different water-containing materials 6, a third placement step similar to the second placement step S6 may be performed between the current supply step S9 and the second measurement step S10. Only either one of the second placement step S6 or the third placement step may be performed. For the cleaning step S4, first measurement step S5, current supply step S9, and second measurement step S10 using the common water-containing material 6, none of the second placement step S6 and third placement step may be performed.

The present disclosure enables a highly reliable and simple measurement method and measurement device for measuring a size of expansion of a surface treatment film with high versatility, and a corrosion resistance test method and corrosion resistance test apparatus for a coated metal material, to be provided, and is thus quite useful.

What is claimed is:

1. A measurement method for measuring a size of expansion of at least one damaged portion of a surface treatment film occurred in a coated metal material that includes a metal base and the surface treatment film provided on the metal base, the measurement method comprising the steps of:
   disposing a water-containing material to be in contact with the at least one damaged portion and an electrode to be in contact with the water-containing material, and electrically connecting between the electrode and the metal base with an external circuit;
   applying, with the external circuit, a constant DC voltage between the electrode and the metal base, as a cathode and an anode, respectively, and measuring a current value flowing therebetween; and
   calculating, with a calculator, a size of the expansion of the at least one damaged portion based on a lowest value or an average value during predetermined time of the current value measured and a correlation between the current value and the size of the expansion of the at least one damaged portion, the correlation being determined on an exploratory basis in advance.

2. The measurement method of claim 1, wherein the constant DC voltage is less than a theoretical voltage at which electrolysis of water occurs to generate hydrogen.

3. The measurement method of claim 2, wherein the constant DC voltage is less than 1.23 V.

4. The measurement method of claim 3, wherein the size of the expansion of the at least one damaged portion is an area of the expansion of the at least one damaged portion, and the area of the expansion of the at least one damaged portion is 0.1 $mm^2$ or more to 200 $mm^2$ or less.

5. The measurement method of claim 4, wherein the surface treatment film is a resin coating film.

6. A measurement device for measuring a size of expansion of the at least one damaged portion of a surface treatment film occurred in a coated metal material that includes a metal base and the surface treatment film provided on the metal base, the measurement device comprising:
   an electrode to be in contact with a water-containing material disposed to be in contact with the at least one damaged portion;
   an external circuit configured to electrically connect between the electrode and the metal base;

a current supplier provided on the external circuit and configured to supply a constant DC voltage between the electrode and the metal base as a cathode and an anode, respectively;

a current detector configured to detect a current value flowing between the electrode and the metal base; and a calculator configured to calculate a size of the expansion of the at least one damaged portion, based on the lowest value or an average value during predetermined time of the current value detected and a correlation between the current value and the size of the expansion of the at least one damaged portion, the correlation being determined on an exploratory basis in advance.

7. The measurement device of claim 6, wherein the constant DC voltage is less than a theoretical voltage at which electrolysis of water occurs to generate hydrogen.

8. The measurement device of claim 7, wherein the constant DC voltage is less than 1.23 V.

9. A corrosion resistance test method for a coated metal material that includes a metal base and a surface treatment film provided on the metal base, the corrosion resistance test method comprising the steps of:

preparing a coated metal material having the at least one damaged portion which is one or more damaged portions reaching the metal base through the surface treatment film;

disposing a water-containing material to be in contact with one or two out of the one or more damaged portions and one or two electrodes to be in contact with the water-containing material, and electrically connecting between the electrode and the metal base, or between the two electrodes, with an external circuit;

measuring a size of one or two out of the one or more damaged portions;

supplying, with the external circuit, a current between the electrode and the metal base, or between one of the two electrodes and the other, as an anode and a cathode, respectively to expand the surface treatment film around the one or two out of the one or more damaged portions;

measuring a size of expansion of the one or two out of the one or more damaged portions of the surface treatment film using the measurement method of claim 1; and calculating a progress degree of corrosion of the coated metal material, based on the size of the one or two out of the one or more damaged portions and the size of the expansion of the one or two out of the one or more damaged portions, wherein the progress degree of corrosion is a difference between the size of the one or two out of the one or more damaged portions and the size of the expansion of the one or two out of the one or more damaged portions of the surface treatment film, or a progress rate of peeling of the surface treatment film.

10. The corrosion resistance test method of claim 9, further comprising the step of correcting the calculated progress degree of the corrosion of the coated metal material, based on the size of the one or two out of the one or more damaged portions and a correlation between the size of the damaged portion and the progress degree of the corrosion of the coated metal material, the correlation being determined on an exploratory basis in advance.

11. The corrosion resistance test method of claim 10, wherein the progress degree of corrosion is a rate of increase in the size of the expansion of the one or two out of the one or more damaged portions of the surface treatment film.

12. The corrosion resistance test method of claim 9, wherein the one or more damaged portions are one or more artificially damaged portions.

13. The corrosion resistance test method of claim 12, wherein the one or more artificially damaged portions are in a dot shape in a plan view.

14. A corrosion resistance test apparatus for a coated metal material that includes a metal base and a surface treatment film provided on the metal base, the corrosion resistance test apparatus comprising:

one or two electrodes to be in contact with a water-containing material disposed to be in contact with the at least one damaged portion which is one or two out of one or more damaged portions reaching the metal base through the surface treatment film;

an external circuit configured to electrically connect between the electrode and the metal base, or between the two electrodes;

an additional measurement device for measuring a size of the one or two out of the one or more damaged portions;

a current supplier provided on the external circuit and configured to supply a current between the electrode and the metal base, or between one of the two electrodes and the other, as an anode and a cathode, respectively to expand the surface treatment film around the one or two out of the one or more damaged portions;

the measurement device of claim 6, for measuring the size of the expansion of the one or two out of the one or more damaged portions of the surface treatment film; and a calculator configured to calculate a progress degree of corrosion of the coated metal material, based on the size of the one or two out of the one or more damaged portions and the size of the expansion of the one or two out of the one or more damaged portions, wherein the progress degree of corrosion is a difference between the size of the one or two out of the one or more damaged portions and the size of the expansion of the one or two out of the one or more damaged portions of the surface treatment film, or a progress rate of peeling of the surface treatment film.

15. The corrosion resistance test apparatus of claim 14, further comprising:

a corrector configured to correct the progress degree of the corrosion of the coated metal material calculated by the calculator, based on the size of the one or two out of the one or more damaged portions and a correlation between the size of the damaged portion and the progress degree of the corrosion of the coated metal material, the correlation being determined on an exploratory basis in advance.

16. The measurement method of claim 1, wherein the constant DC voltage is less than 1.23 V.

17. The measurement method of claim 1, wherein the size of the expansion of the at least one damaged portion is an area of the expansion of the at least one damaged portion, and the area of the expansion of the at least one damaged portion is 0.1 mm$^2$ or more to 200 mm$^2$ or less.

18. The measurement method of claim 1, wherein the surface treatment film is a resin coating film.

19. The measurement device of claim 6, wherein the constant DC voltage is less than 1.23 V.

20. The corrosion resistance test method of claim 9, wherein
- the progress degree of corrosion is a rate of increase in the size of the expansion of the one or two out of the one or more damaged portions of the surface treatment film.

* * * * *